(12) United States Patent
Kobayashi et al.

(10) Patent No.: US 10,171,730 B2
(45) Date of Patent: Jan. 1, 2019

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventors: Toshihiro Kobayashi, Tokyo (JP); Daisuke Kotake, Yokohama (JP); Masahiro Suzuki, Kawasaki (JP); Masakazu Fujiki, Kawasaki (JP); Akihiro Katayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 15/415,048

(22) Filed: Jan. 25, 2017

(65) Prior Publication Data
US 2017/0236301 A1     Aug. 17, 2017

(30) Foreign Application Priority Data

Feb. 15, 2016 (JP) ................................ 2016-026345
Aug. 26, 2016 (JP) ................................ 2016-166011

(51) Int. Cl.
| | | |
|---|---|---|
| G06K 9/00 | (2006.01) | |
| H04N 5/232 | (2006.01) | |
| G06T 7/579 | (2017.01) | |
| G01B 11/00 | (2006.01) | |

(52) U.S. Cl.
CPC ....... *H04N 5/23222* (2013.01); *G01B 11/002* (2013.01); *G06T 7/579* (2017.01)

(58) Field of Classification Search
CPC ........... G06T 2207/30244; G06T 2207/10004; G01B 11/24; G01S 17/89; G01S 7/497
USPC ................................. 382/100, 103, 113, 154
See application file for complete search history.

(56) References Cited

U.S. PATENT DOCUMENTS

| | | | |
|---|---|---|---|
| 8,787,614 B2 | 7/2014 | Choi et al. | |
| 9,070,216 B2 * | 6/2015 | Golparvar-Fard | .... G06T 19/006 |
| 9,557,167 B2 | 1/2017 | Kobayashi et al. | |
| 2015/0292863 A1 | 10/2015 | Furihata et al. | |
| 2015/0310663 A1 | 10/2015 | Yamasaki et al. | |
| 2015/0352719 A1 | 12/2015 | Nakazato et al. | |
| 2015/0362312 A1 | 12/2015 | Higo et al. | |
| 2016/0102972 A1 | 4/2016 | Kobayashi | |
| 2016/0155235 A1 | 6/2016 | Miyatani et al. | |

(Continued)

*Primary Examiner* — Charlotte M Baker
(74) *Attorney, Agent, or Firm* — Carter, DeLuca Farrell & Schmidt, LLP

(57) ABSTRACT

An apparatus comprises an unit configured to obtain captured images captured at a plurality of positions/orientations; an unit configured to generate a guidance instruction for causing a captured image corresponding to a position/orientation substantially the same as a captured image of a stipulated state to be obtained; an unit configured to output the guidance instruction; an unit configured to determine whether or not one captured image obtained after output of the guidance instruction was captured at a position/orientation substantially the same as the captured image of the stipulated state; and an unit configured to, if the one captured image is determined to be captured at the position/orientation, generate or update a three-dimensional map from three-dimensional coordinates of a feature included in a captured image based on the plurality of captured images including the one captured image.

17 Claims, 13 Drawing Sheets

(56) References Cited

U.S. PATENT DOCUMENTS

2016/0156899 A1    6/2016   Higo et al.
2016/0260027 A1    9/2016   Kuwabara et al.
2017/0206676 A1    7/2017   Nakazato et al.

* cited by examiner

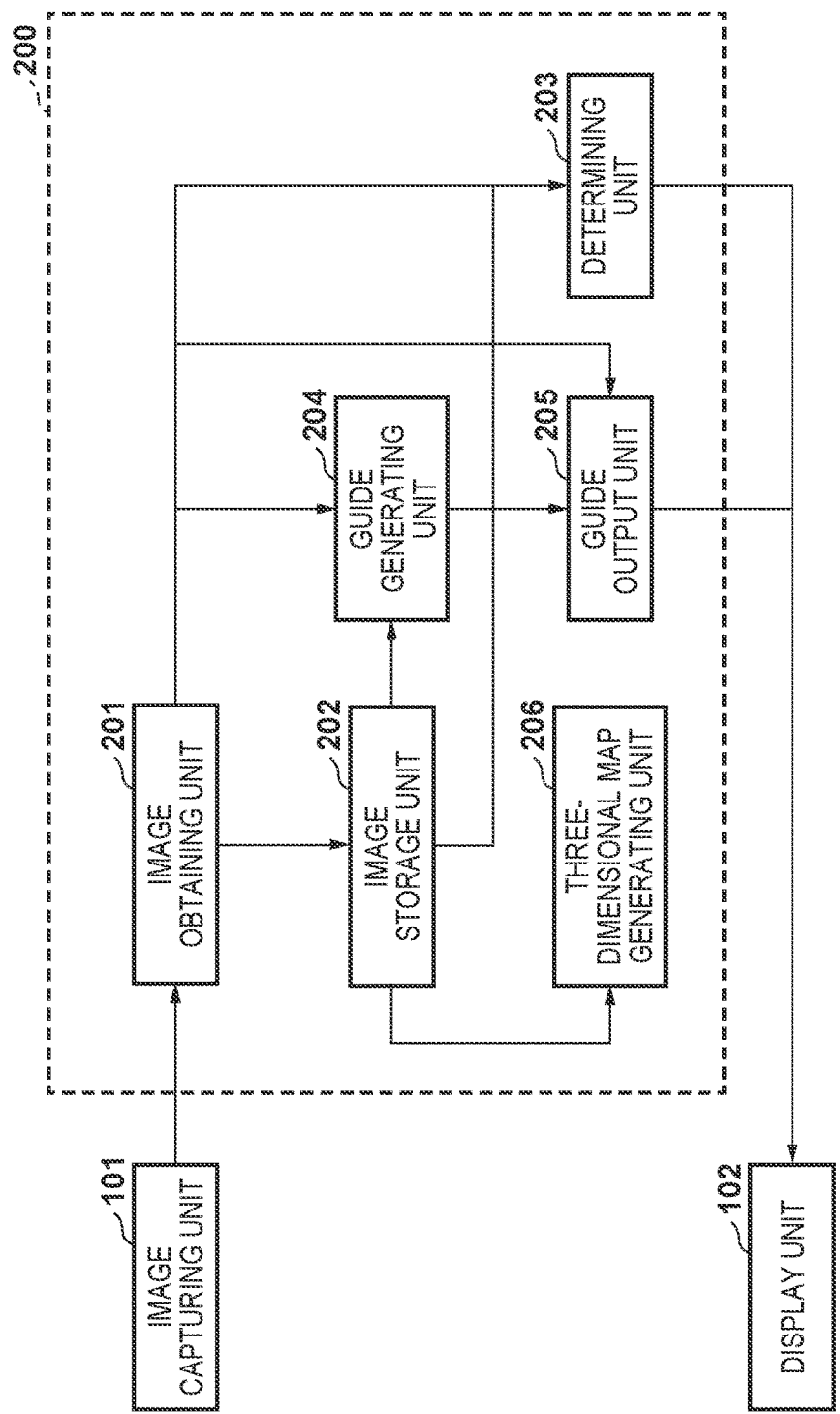

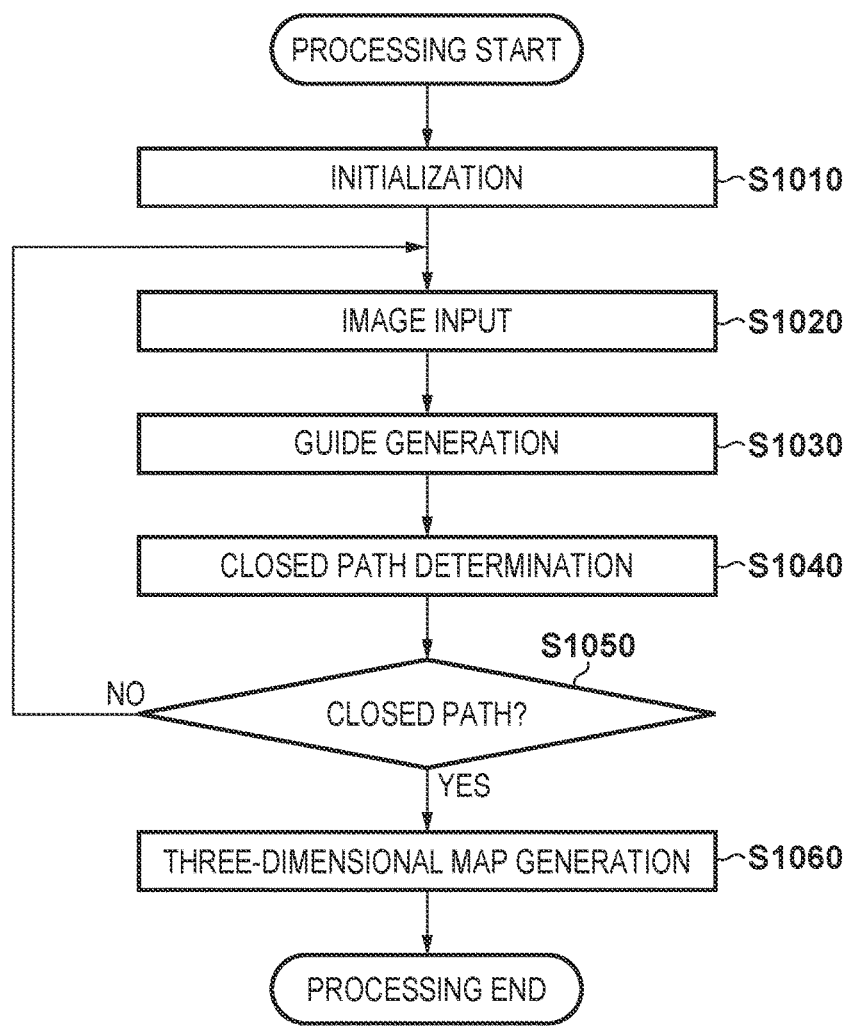

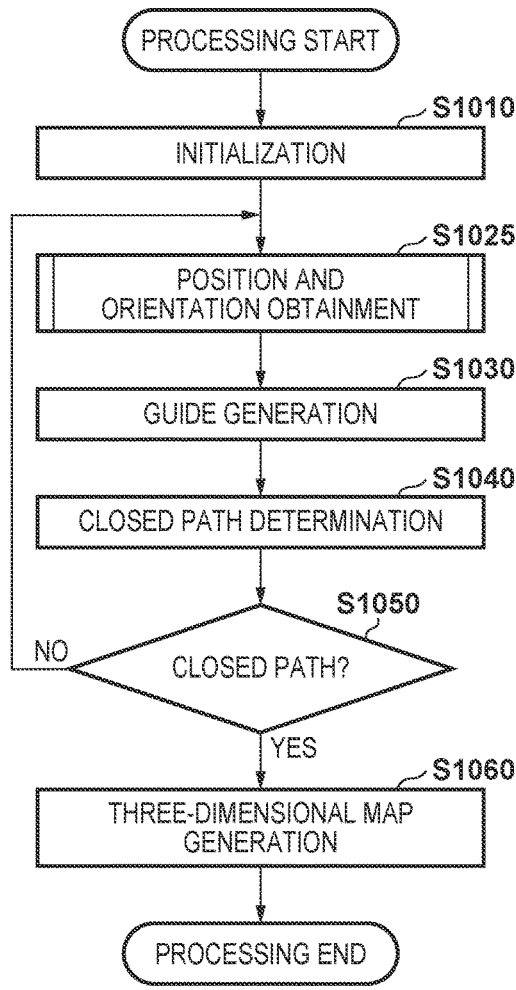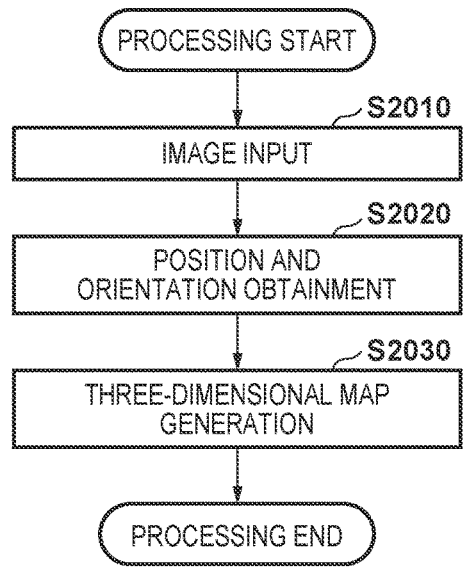

F I G. 14
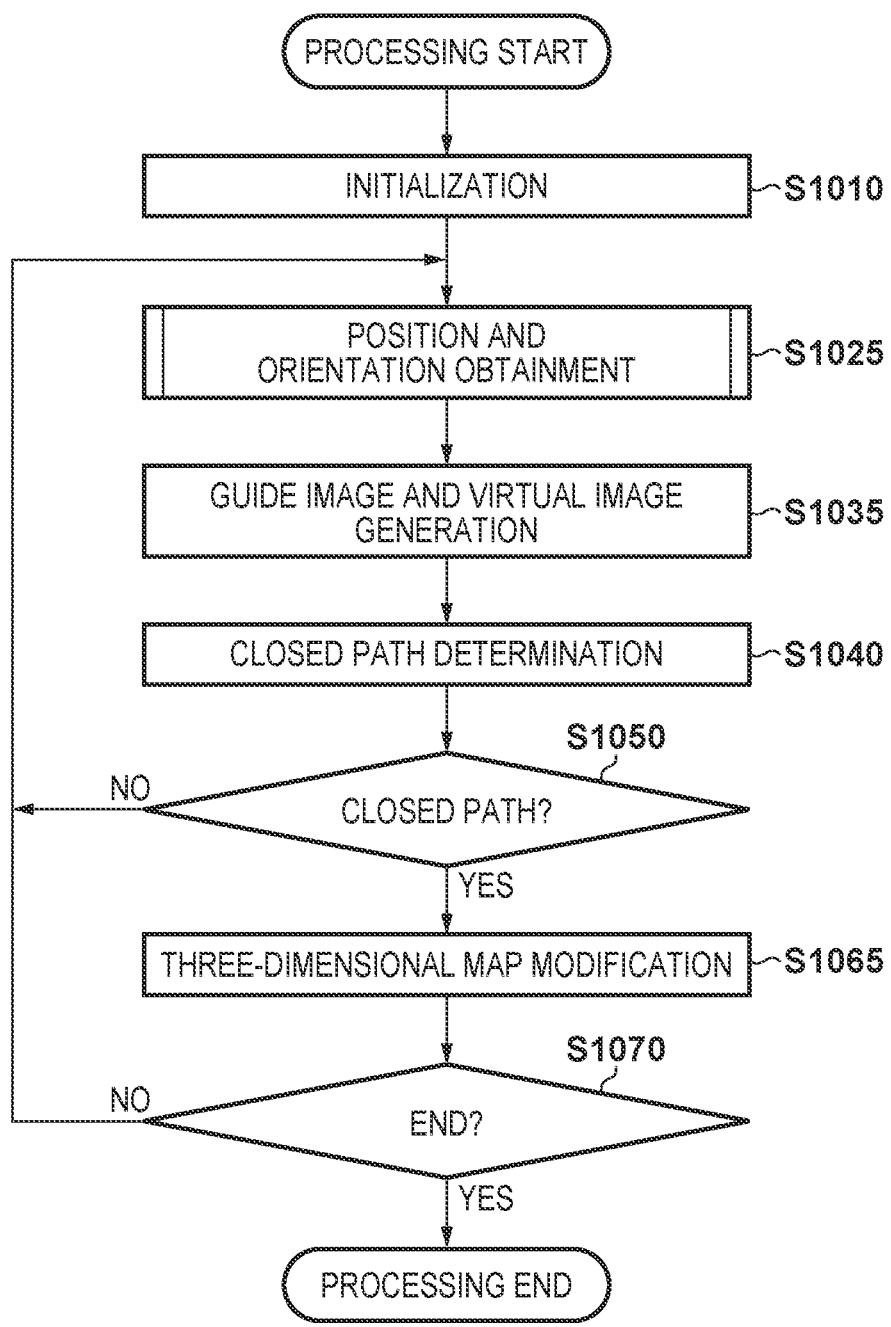

INFORMATION PROCESSING APPARATUS, METHOD OF CONTROLLING INFORMATION PROCESSING APPARATUS, AND STORAGE MEDIUM

BACKGROUND OF THE INVENTION

Field of the Invention

The present invention relates to an information processing apparatus, a method of controlling an information processing apparatus, and a storage medium.

Description of the Related Art

In recent years, a technique of calculating a position and orientation of an image capturing apparatus based on a feature appearing in an image acquired by the image capturing apparatus is called SfM (Structure from Motion) or SLAM (Simultaneous Localization And Mapping), and is used widely in AR (Augmented Reality) and MR (Mixed Reality) in which images that are virtually generated by a calculator are presented overlapping a sensed image.

In SfM and SLAM, if an image capturing apparatus (or a user of the apparatus that holds it) moves around a wide space, the longer the movement distance of the image capturing apparatus becomes, the more a misalignment gradually arises between an estimated value of a position and orientation of the image capturing apparatus and three-dimensional coordinates (a three-dimensional map) of a feature point in the space that is detected. To resolve this, a method called "loop closing", in which a closed path is formed by causing the image capturing apparatus to move in a circle and an optimization is performed so as to cause the positions and orientations of the start point and the end point of the path to match, is widely employed. In the specification of U.S. Pat. No. 8,787,614, generating a three-dimensional map when loop closing can be applied, and completing processing is disclosed.

However, in the specification of U.S. Pat. No. 8,787,614, there is no mention of a method for guiding the user of the apparatus to the start point of the path in order to perform "loop closing" reliably. For this reason, there is the problem that it is not easy to generate a high precision three-dimensional map.

The present invention is something conceived in view of the foregoing problem, and provides a technique for realizing generation of a high precision three-dimensional map.

SUMMARY OF THE INVENTION

According to one aspect of the present invention, there is provided an information processing apparatus, comprising: an obtaining unit configured to obtain captured images that are captured by an image capturing unit at a plurality of positions and orientations; a generation unit configured to generate a guidance instruction for causing a captured image corresponding to a position and orientation substantially the same as a captured image of a stipulated state to be obtained; an output unit configured to output the guidance instruction; a determination unit configured to determine whether or not one captured image obtained by the obtaining unit after output of the guidance instruction was captured at a position and orientation substantially the same as the captured image of the stipulated state; and a map generation unit configured to, if the one captured image is determined to be captured at a position and orientation substantially the same as the captured image of the stipulated state, generate or update a three-dimensional map from three-dimensional coordinates of a feature included in a captured image based on the plurality of captured images including the one captured image that are captured at the plurality of positions and orientations.

Further features of the present invention will become apparent from the following description of exemplary embodiments with reference to the attached drawings.

BRIEF DESCRIPTION OF THE DRAWINGS

FIG. 1 is a view illustrating a configuration of a system and an information processing apparatus configuration according to a first embodiment.

FIG. 4 is a flowchart illustrating a procedure of a process that an information processing apparatus according to the first embodiment performs.

FIG. 8A-FIG. 8B are flowcharts illustrating procedures of processes that the information processing apparatus according to the second embodiment performs.

FIG. 14 is a flowchart illustrating a procedure of a process that the information processing apparatus according to the fourth embodiment performs.

DESCRIPTION OF THE EMBODIMENTS

Figure 2A:
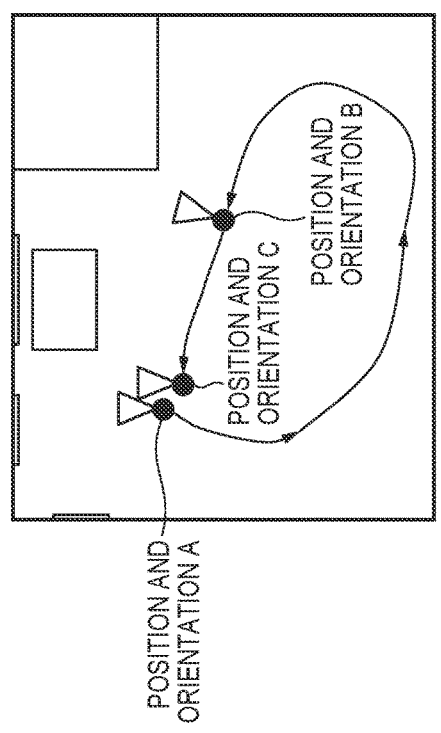
FIG. 2A-FIG. 2D are views illustrating examples of input images, an initial position and orientation image and a positional relationship therebetween according to the first embodiment.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Overview>

In the present embodiment, description will be given for an information processing apparatus which can be applied in a case when a high precision three-dimensional map is generated and prepared in advance prior to an MR (or AR) experience. A user of the information processing apparatus captures an image sequence for generating the three-dimensional map while holding a connected camera and moving. The apparatus of the present invention guides the user to enable loop closing. Specifically, an image, which is captured at an initial position and orientation (a stipulated position and orientation) and that becomes a start point of a path, is presented to the user.

While watching this image, the user moves the camera such that the position and orientation of the camera approximately match the initial position and orientation (stipulated position and orientation). The information processing apparatus determines that the camera approximately reaches the initial position and orientation (stipulated position and orientation) and performs the loop closing process. Thereby, the information processing apparatus performs an optimization such that the position and orientation between the start point and an end point of the path are caused to match, and generates a high precision three-dimensional map.

<System Configuration>

FIG. 1 is a view illustrating a configuration of a system according to the first embodiment. Each frame in the rectangle in FIG. 1 indicates a functional module for performing respective processing of the present embodiment, and the arrow symbols indicate a flow of data. The system according to the first embodiment is equipped with an information processing apparatus 200, and an image capturing unit 101 and a display unit 102 connected thereto. The configuration of FIG. 1 is only an example, and there is no limitation to what is illustrated.

The image capturing unit 101 captures a sequence of images while a user changes the position and orientation in a space in which to generate a three-dimensional map using the information processing apparatus 200. The image capturing unit 101 is used after being connected to the information processing apparatus 200, and continuously captures images periodically in short intervals such as 30 times per second, for example. An image is inputted into an image obtaining unit 201 every time one is captured. Specifically, the image capturing unit 101 is a camera equipped in a head mounted display (HMD).

The display unit 102 displays images to present to a user. The presented images are supplied from the information processing apparatus 200 (more specifically, from a guide output unit 205). Specifically, the display unit 102 is a display apparatus such as a monitor, or a liquid crystal panel equipped in an HMD.

<Configuration of the Information Processing Apparatus>

The information processing apparatus 200 is equipped with the image obtaining unit 201, an image storage unit 202, a determining unit 203, a guide generating unit 204, the guide output unit 205, and a three-dimensional map generating unit 206.

The image obtaining unit 201 reads an image that the image capturing unit 101 captured into the information processing apparatus 200, and outputs it, as an input image 10, to the image storage unit 202, the determining unit 203, the guide generating unit 204, and the guide output unit 205.

The image storage unit 202 stores/holds input images 10 at the respective times at which the image obtaining unit 201 obtains them. Also, the image storage unit 202, in a state in which preparation for capturing in order to generate a three-dimensional map is completed, registers the input image 10, which is captured at a particular timing that the user designated, as an initial position and orientation image 20 (a captured image corresponding to a stipulated position and orientation).

More specifically, the image storage unit 202 holds the input image 10, adding a label to it to treat it as an initial position and orientation image. The information processing apparatus 200, upon generating a high precision three-dimensional map, presents guidance instructions to the user so as to capture an image of a position and orientation that roughly match the initial position and orientation so that a movement history of the image capturing unit 101 forms a closed path. The image storage unit 202 holds the initial position and orientation image 20 which defines a state that is the target of the guidance for the user.

Figure 2B:
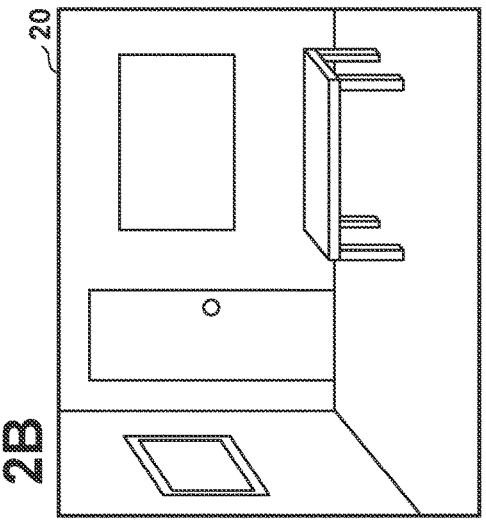

FIG. 2A and FIG. 2B illustrate examples of a movement history of the image capturing unit 101 and the initial position and orientation image 20. FIG. 2A is an overhead view in which a measurement area is observed from above, and black circles indicate positions of the image capturing unit 101, where triangles indicate the field of view of the image capturing unit 101 (the vertex of the triangle is the viewpoint position, and the bottom side of the triangle is the field of view). In FIG. 2A, it is indicated that the image capturing unit 101 moves following the arrow symbols from a position and orientation A to a position and orientation B to a position and orientation C. The initial position and orientation image 20 illustrated in FIG. 2B is an image that is captured at the position and orientation A in FIG. 2A.

The determining unit 203 performs closed path determination processing for determining whether or not, as the result of guidance by the guide generating unit 204 and the guide output unit 205, the position and orientation of the image capturing unit 101 reached the initial position and orientation, and the track of the position and orientation from the time of initial position and orientation registration formed a closed path. In the present embodiment, the determining unit 203 has at least two modes: an activation mode and a closed path determination mode.

Since the position and orientation of the image capturing unit 101 do not change much immediately after registering the initial position and orientation image 20, there is a possibility that a closed path will be erroneously determined even though there was hardly any substantial movement, and no closed path was formed. For this reason, the determining unit 203 does not perform closed path detection determination processing when in the activation mode. Alternatively, configuration may be taken so as so as to perform closed path detection determination processing even in the activation mode, but not consider a closed path to be formed even if the determination succeeds. In the present embodiment, the determining unit 203 transitions to the closed path determination mode from the activation mode when a stipulated time elapses from the time of initial position and orientation registration.

The determining unit 203, in the case of the closed path determination mode, performs closed path determination processing by comparing the input image 10 which is currently input from the image obtaining unit 201 and the initial position and orientation image 20 that the image storage unit 202 holds. That is, the determining unit 203 determines whether or not the current position and orientation of the image capturing unit 101 roughly matches the position and orientation at the time of registration of the initial position and orientation image 20. If they roughly match, the user of the information processing apparatus 200 is notified to that effect, and prompted to complete capturing.

Figure 3B:
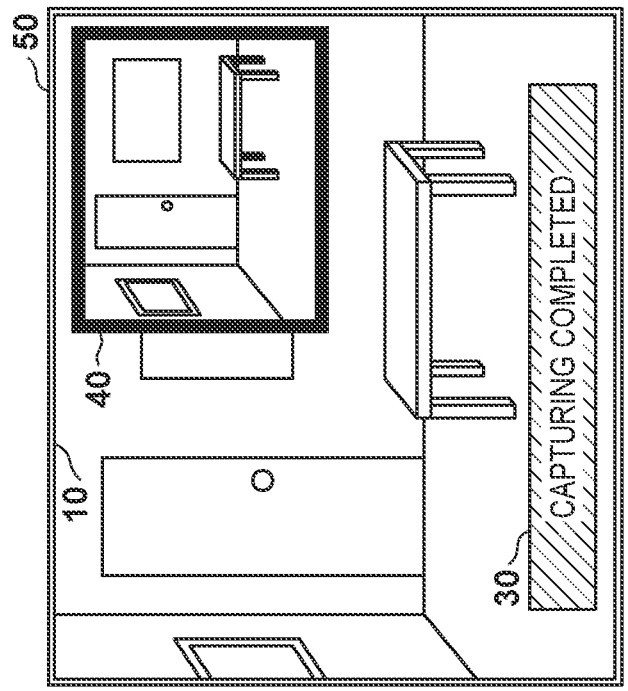
FIG. 3A-FIG. 3B are views illustrating examples of output images according to the first embodiment.

Specifically, the determining unit 203, as illustrated in FIG. 3B, generates a display form 30 for notifying that a closed path has be attained, and outputs it to the guide output unit 205. Furthermore, the determining unit 203 causes the image storage unit 202 to store the input image 10 at this point in time as a closed path attaining image by adding a label. Otherwise, a guidance instruction for causing the position and orientation of the image capturing unit 101 to roughly match the initial position and orientation is made to the user of the information processing apparatus 200 by processing of the guide generating unit 204 that is described later.

Next, the content of closed path determination processing by the determining unit 203 is described. The condition by which a closed path is determined (a condition under which loop closing can be applied) is that overlapping to an extent that features common to both capturing regions are detected exists in the captured image at the start point of the closed path and the captured image at the end point, and the relative position and orientation between the two images can be calculated. There being many regions in common between the two images means that the position and orientation of the two resemble each other, and are treated as being a continuation, and therefore in the present embodiment, Bag of Words (BoW) is applied to perform the closed path determination. BoW is something in which similarities between a plurality of images are calculated depending on frequency of appearance of a feature included in the images. The determining unit 203 determines that the closed path is detected if the BoW similarity exceeds a threshold, that is if there is a high similarity between a start point image and an end point image.

Figure 2C:
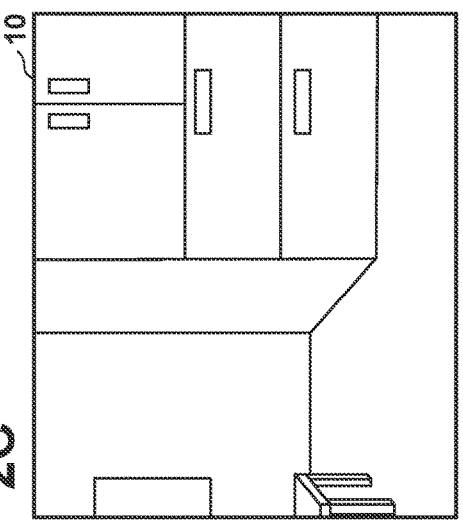

Here, FIG. 2C illustrates an example of the input image 10, which captures the same environment as the initial position and orientation image 20 of FIG. 2B from the position and orientation B in FIG. 2A. Because there is very little overlapping between the respective captured regions of the input image 10 of FIG. 2C and the initial position and orientation image 20 of FIG. 2B, the determining unit 203 determines that the position and orientation of the input image 10 in FIG. 2C does not form a closed path in relation to the initial position and orientation image 20.

Figure 2D:
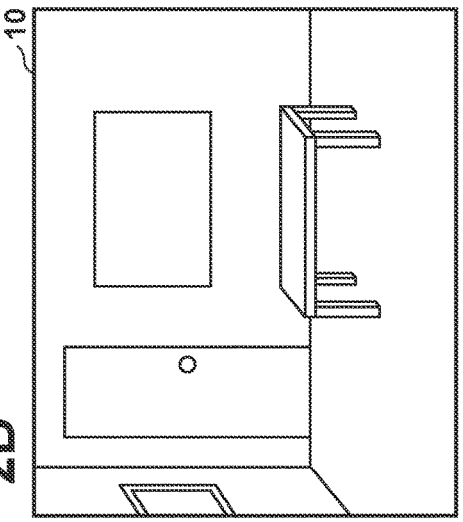

Meanwhile, FIG. 2D illustrates an example of the input image 10 which captures the same environment as the initial position and orientation image 20 of FIG. 2B from the position and orientation C in FIG. 2A. Because there is a lot of overlap in the respective captured regions between the input image 10 of FIG. 2D and the initial position and orientation image 20 of FIG. 2B, the determining unit 203 succeeds in the closed path determination processing. Therefore, it determines that the position and orientation of the input image 10 in FIG. 2D form the closed path in relation to the initial position and orientation image 20.

Figure 3A:
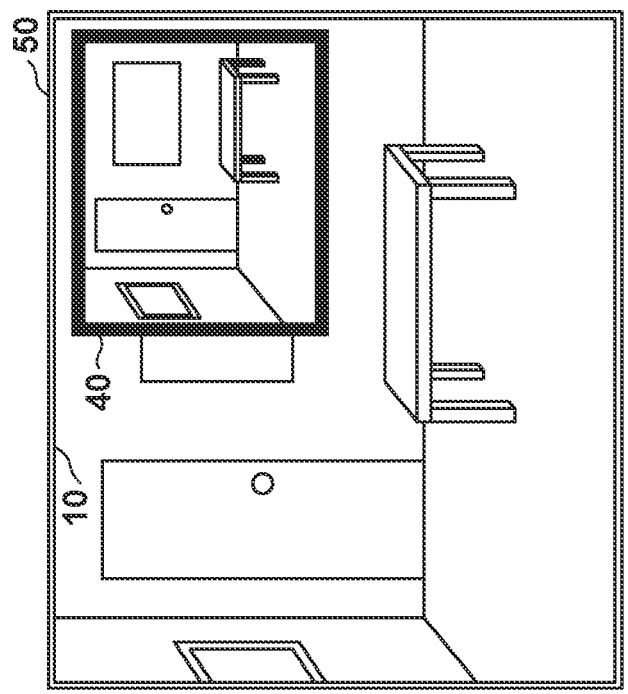

The guide generating unit 204 generates a guidance instruction image 40 as illustrated in FIG. 3A and FIG. 3B when the determining unit 203 transitions from the activation mode to the closed path determination mode, and outputs it to the guide output unit 205. The guidance instruction image 40 is an image that is presented to the user of the information processing apparatus 200, and that indicates the position and orientation to which to move next. In the present embodiment, the guide generating unit 204 uses the initial position and orientation image 20 that the image storage unit 202 holds as the guidance instruction image 40. That is, the guidance instruction image 40 in the present embodiment is the same as the initial position and orientation image 20.

The guide output unit 205 generates an image to present to the user by display on the display unit 102. In the present embodiment, as illustrated in FIG. 3A and FIG. 3B, an output image 50 is generated by superimposing the guidance instruction image 40 on the input image 10. The output image is outputted to the display unit 102 which is external to the information processing apparatus 200. In FIG. 3A and FIG. 3B, an example of the output image 50 in the present embodiment is illustrated.

The three-dimensional map generating unit 206 generates a three-dimensional map by SLAM processing with reference to the sequence of input images 10 held thus far in the image storage unit 202 if capturing is completed by an operation from the user of the apparatus. Also, in such a case, optimization processing by loop closing is performed, associating the position and orientation of the initial position and orientation image 20 (the start point) and the closed path attaining image (the end point) as a continuation.

<Processing>

The control of the information processing apparatus 200 according to the present embodiment which is equipped with the foregoing configuration is described below. FIG. 4 is a flowchart illustrating a procedure of a process that the information processing apparatus 200 according to the present embodiment performs.

Firstly, when the information processing apparatus 200 is activated, an initialization process is performed in step S1010. In the initialization process of step S1010, processing necessary for activating each module, and processing for setting the determining unit 203 to the activation mode is included.

In step S1020, the image capturing unit 101 captures the current input image 10. The input image 10 is fed into the information processing apparatus 200 through the image obtaining unit 201. In step S1030, the guide generating unit 204 generates the guidance instruction image 40 and outputs it to the guide output unit 205. As explained previously, in the present embodiment, the guide generating unit 204 generates the initial position and orientation image 20 that the image storage unit 202 holds as the guidance instruction image 40. The guide output unit 205 superimposes the guidance instruction image 40 on the input image 10 to generate the output image 50.

In step S1040, the determining unit 203 performs closed path determination processing on the current input image 10 if the operation mode is a closed path determination mode. If the determining unit 203 is in the activation mode, the operation mode of the determining unit 203 is transitioned from the activation mode to the closed path determination mode after the image storage unit 202 performs registration of the initial position and orientation image 20 and a predetermined time elapses.

In step S1050, if the closed path determination processing succeeds in step S1040 (the closed path is formed), the determining unit 203 registers the input image 10 in the image storage unit 202 as the closed path attaining image, and proceeds to step S1060. Otherwise, the processing returns to step S1020.

In step S1060, the three-dimensional map generating unit 206, using the input images 10 stored thus far, the initial position and orientation image 20, and the closed path attaining image, performs processing for generating the three-dimensional map from the three-dimensional coordinates of features included in the captured image, and optimization processing according to loop closing. When the optimized three-dimensional map is generated, the processing of the present embodiment completes.

As discussed above, by virtue of the present embodiment, it becomes possible to provide guidance to a user of an apparatus regarding the movement of an image capturing unit so as to form a closed path for which a loop closing process can be applied. Also, generation of a high precision three-dimensional map becomes possible by applying the loop closing process to the image sequence that is obtained.

[First Variation]

Configuration may be taken such that, in step S1030, the determining unit 203 transitions from the activation mode to the closed path determination mode, adding to the condition that the determination process of step S1050 fails a stipulated number of times in addition to the elapsed time from when the initial position and orientation is registered. With such a configuration, it is possible to prevent transition to the closed path determination mode in a case where the user of the information processing apparatus 200 is stationary for more than a fixed time while maintaining the initial position and orientation.

[Second Variation]

In step S1050, the determining unit 203 may make an association of feature points using SIFT from both the initial position and orientation image 20 and the current input image 10, and obtain a transformation between the two images such as an affine transformation, a nomography transformation, or the like, rather than using BoW. In such a case, one image may be transformed into the other image, a reciprocal of a sum total of luminance differences between these images may be made to be a similarity, and a closed path may be determined to have been detected when this is larger than a threshold. Also, configuration may be taken so as to take a ratio between a number of extracted feature points and a number of feature points for which association succeeded, and determine that a closed path is detected if this is greater than or equal to a threshold.

[Third Variation]

Configuration may be taken such that if the user of the information processing apparatus 200 approaches the initial position and orientation, a display of the input image 10 and the guidance instruction image 40 which are overlapped is changed to. For the change of display, any method may be used if it is possible thereby to recognize that the user approached the initial position and orientation. Also, any method may be used for the determination as to whether or not the initial position and orientation is approached.

In the second variation, for the guide generating unit 204 and the guide output unit 205, the user of the information processing apparatus 200 may be treated as having approached the initial position and orientation if the number of feature points that correspond between the initial position and orientation image 20 and the current input image 10 increases. If the number of corresponding feature points increases, it becomes possible to distinguish a situation in which the user of the information processing apparatus 200 has approached the initial position and orientation by a change of the tone of the input image 10 in accordance with this ratio of corresponding feature points.

[Fourth Variation]

Configuration may be taken such that if the guide output unit 205 succeeds at the closed path determination processing of step S1050, it notifies the user that it is possible to complete capturing. FIG. 3B displays the character sequence "capturing completed" as the display form 30 for notifying that the closed path is attained. This is something that presents information to the user that it is possible to complete capturing because the positions and orientations of a plurality of images (the input image 10) captured thus far form a closed path and it was possible to obtain all necessary images. The notification to the user may be anything if it is something by which the user can recognize that it is possible to complete capturing. Configuration may be taken so as to present speech or a vibration to the user rather than the display form 30.

[Fifth Variation]

Configuration may be taken such that the processing proceeds to step S1020 after it is confirmed that the space that is the target of generation of the three-dimensional map is included in the field of view of the image capturing unit 101 in step S1010. With such a configuration, it is possible to prevent a reduction in precision of the three-dimensional map in the case when immediately after activation, the image capturing unit 101 captures an environment from which the three-dimensional map is not actually to be generated. Configuration may be taken so as cause the information processing apparatus 200 to make a notification to the user of the information processing apparatus 200 that preparation has completed by a button, a switch or the like, and configuration may be taken so that the information processing apparatus 200 automatically determines this using a condition that the image capturing unit 101 was able to observe a particular object in the environment, for example.

[Sixth Variation]

For the image capturing unit 101 in the present embodiment, an apparatus, such as a depth sensor, a thermographic camera, or the like, that changes information other than brightness to obtain a luminance value, may be used, and anything may be used if it is something by which the user of the apparatus can distinguish the current and initial position and orientation from an image. Also, closed path determination processing may be executed using a data group or images obtained from the image capturing unit 101 configured in these apparatuses.

[Seventh Variation]

The SLAM processing that the three-dimensional map generating unit 206 performs may use any method if it is something that can calculate three-dimensional coordinates of feature points and the positions and orientations at which the input images 10 are respectively captured from a sequence of input images 10.

Second Embodiment

<Overview>

In the present embodiment, description will be given for an information processing apparatus which can be applied in a case when a high precision three-dimensional map is generated and prepared in advance prior to an MR (or AR) experience. A user of the information processing apparatus captures an image sequence for generating the three-dimensional map while holding a connected camera and moving. The information processing apparatus of the present invention uses the estimated position and orientation to guide the user so that loop closing becomes possible. Specifically, an image that indicates a direction in which to reach the initial position and orientation which is the start point of the path from the current position and orientation is presented to the user. While watching this image, the user moves the camera such that the position and orientation of the camera approximately match the initial position and orientation.

Because a specific movement direction is presented to the user in the present embodiment, it becomes possible to cause the position and orientation of the camera to match the initial position and orientation more efficiently. The information processing apparatus determines that the camera approximately reaches the initial position and orientation and performs the loop closing process. Thereby, the information processing apparatus performs an optimization such that the positions and orientations between a start point and an end point of a path are caused to match, and generates a high precision three-dimensional map.

<System Configuration>

Figure 5:
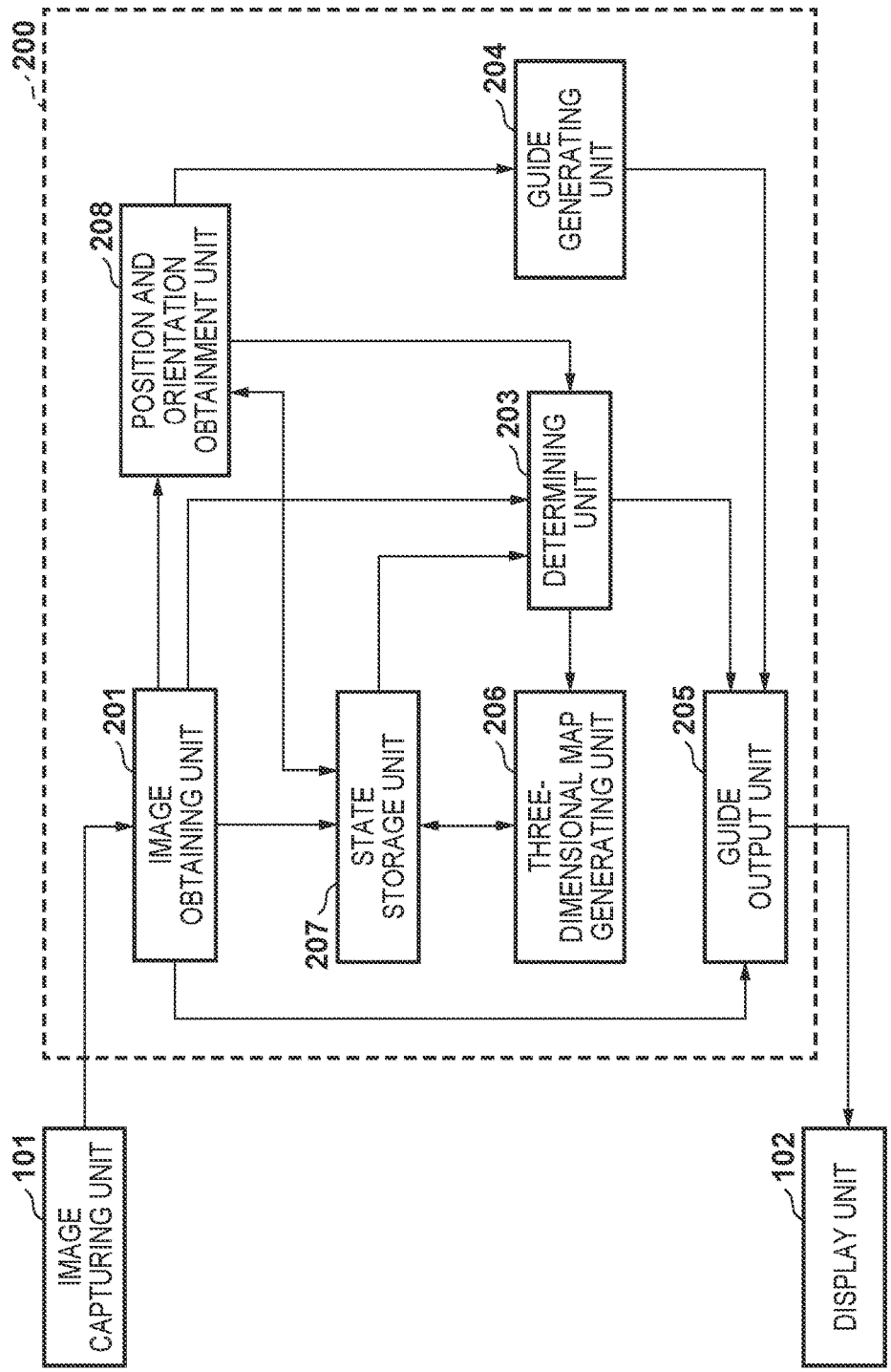
FIG. 5 is a view illustrating a configuration of a system and an information processing apparatus configuration according to a second embodiment.

FIG. 5 is a view illustrating a configuration of a system according to the second embodiment. Each frame in the rectangle in FIG. 5 indicates a functional module for performing respective processing of the present embodiment, and the arrow symbols indicate a flow of data. A system according to the present embodiment is equipped with the information processing apparatus 200, and the image capturing unit 101 and the display unit 102 connected thereto. The configuration of FIG. 5 is only an example, and there is no limitation to what is illustrated. Also, portions that differ from the first embodiment are mainly described, and description is omitted for portions that are the same.

<Configuration of the Information Processing Apparatus>

In the present embodiment, a state storage unit 207 is equipped in substitution for the image storage unit 202. The state storage unit 207 holds, in association with the input image 10, the respective position and orientation of the image capturing unit 101 for a time of capturing of the input image 10. Also, at the time of registration of the initial position and orientation image 20, the state storage unit 207 simultaneously stores the position and orientation at that point in time as the initial position and orientation. That is, in the present embodiment, for the state storage unit 207, all of the input images 10 including the initial position and orientation image 20 and the closed path attaining image are held in a form in which they are in association with their position and orientation. Detailed operation of the state storage unit 207 is described later.

In the present embodiment, a position/orientation obtaining unit 208 is also newly added. The position/orientation obtaining unit 208 using the input image 10 estimates by SLAM processing the position and orientation of the image capturing unit 101 when the current input image 10 is captured. The estimated position and orientation is held in association with the input image 10 by the state storage unit 207. Hereinafter such associated positions and orientations will be denoted the position and orientation of the input image 10. Detailed operation of the position/orientation obtaining unit 208 is described later.

In addition to the determining unit 203 comparing the current input image 10 from the image obtaining unit 201 and the initial position and orientation image 20 that the image storage unit 202 holds, it performs closed path determination processing with reference to the positions and orientations associated with these.

More specifically, the determining unit 203 in addition to the determination of similarity by BoW described in the first embodiment, compares the position and orientation of the input image 10 and the position and orientation of the initial position and orientation image 20. By comparing not only the similarity of images, but also the positions and orientations of the two, it is possible to perform a determination of a closed path more correctly. Comparison may be performed using the Euclidean distance between two three-dimensional coordinates as an index for the positions, and the dot product of two orientation vectors (or the angle formed therebetween) as an index for the orientations.

That is, if the Euclidean distance between two three-dimensional coordinates is smaller than a threshold position can be treated as matching, and if the dot product of two orientation vectors is larger than a threshold the orientation can be treated as matching. Note that regarding the positions and orientations estimated by SLAM, there are cases in which the positions and orientations do not become the same when the same place is reached again, as described above. For this reason, the position threshold may be set to be particularly large at a time of comparison between the initial position and orientation and the current position and orientation.

If the determining unit 203 is in the closed path determination mode, the guide generating unit 204 calculates a direction in which to guide the user of the information processing apparatus 200 and generates a guide instructing image 60 which is described later. The guide instructing image 60 that is generated is outputted to the guide output unit 205. The guide generating unit 204 references the three-dimensional map and the positions and orientations corresponding to the input images 10 held in the state storage unit 207 to generate the guide instructing image 60.

Figure 6B:
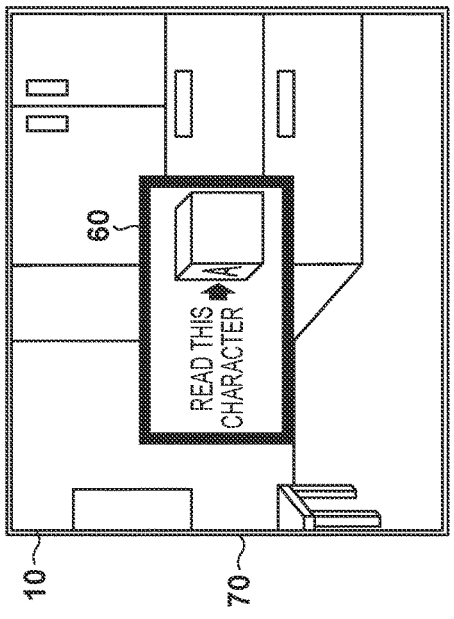
FIG. 6A-FIG. 6C are views illustrating examples of guidance instruction images and output images according to the second embodiment.
Figure 6A:
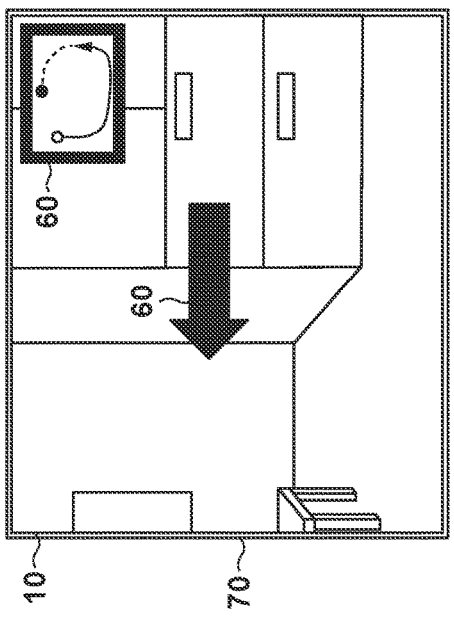

In FIG. 6A, an example in which the guide instructing image 60 and an output image 70 on which it is superimposed are illustrated in the present embodiment. The input image 10 is assumed to be captured at the position and orientation B in FIG. 2A. When the initial position and orientation image 20 is assumed to have been captured at the position and orientation A in FIG. 2A, it is possible to form the closed path if the user of the information processing apparatus 200 is guided in the leftward direction with respect to the position and orientation B, at which the input image 10 in FIG. 6A is captured.

Therefore, in FIG. 6A, as the guide instructing image 60, an arrow symbol indicating the leftward direction is illustrated in the center of the output image 70 and an overhead view indicating the entire measurement area is illustrated in the top-right. In the overhead view, the initial position and orientation (black circle), the track of the position and orientation (solid line arrow symbol), and the path in which to move (broken line arrow symbol) are illustrated. The user of the information processing apparatus 200 can recognize the target position and orientation by the overhead view. Also, by referencing the arrow symbol and the overhead view in the output image 70, it is possible to recognize that one should move towards the left side.

In FIG. 6B, another example in which the guide instructing image 60 and the output image 70 on which it is superimposed are illustrated in the present embodiment. In FIG. 6B, a virtual object of a cubic shape is displayed in the center of the output image 70 as the guide instructing image 60. A character is written on the left side surface of the virtual object, and a message prompting that the character that is written on the left side surface be read is displayed. In such a case, it is possible to expect the user of the information processing apparatus 200 to perform an action of going around from the left side so as to be able to read the character written on the left side surface of the virtual object better. The guide generating unit 204 calculates the rotation angle of the virtual object based on the current position and orientation and the guidance direction.

If guiding the user of the information processing apparatus 200 in a leftward direction, the virtual object is caused to rotate in a direction in which the character written on the virtual object is hidden from the left of the screen in the depth direction. Conversely, if guiding the user of the information processing apparatus 200 in a rightward direction, the virtual object is caused to rotate in a direction in which the character written on the virtual object is hidden from the right of the screen in the depth direction. The guide generating unit 204 causes the virtual object to rotate moment-to-moment in accordance with the position and orientation which are estimated in a short time, and therefore it is possible to guide the user of the information processing apparatus 200 to the desired position and orientation.

Figure 6C:
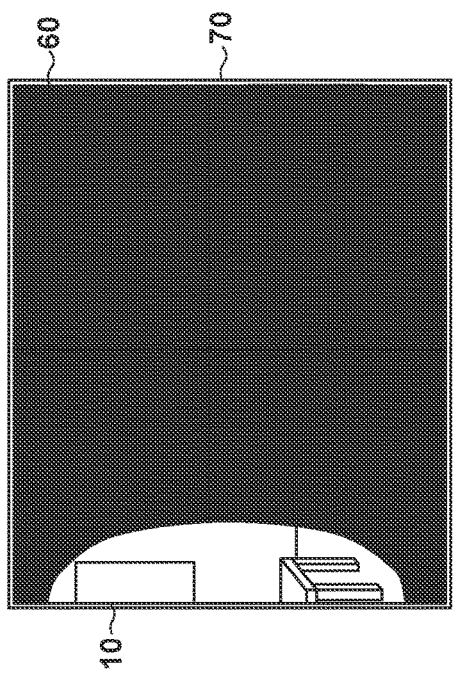

In FIG. 6C, another example in which the guide instructing image 60 and the output image 70 on which it is superimposed are illustrated in the present embodiment. In FIG. 6C, an image for which the part other than the direction in which to guide of the output image 70 is filled in with black is illustrated as the guide instructing image 60. In FIG. 6C, the filling in is done in black, but it may in a different color. Also, configuration may be taken so that even in the covered portion it is possible to partially see some of the input image 10 underneath by making the fill color semi-transparent. The fill color is determined so that it is easy for the user to move toward the portion in which the output image 70 is bright.

Figure 7A:
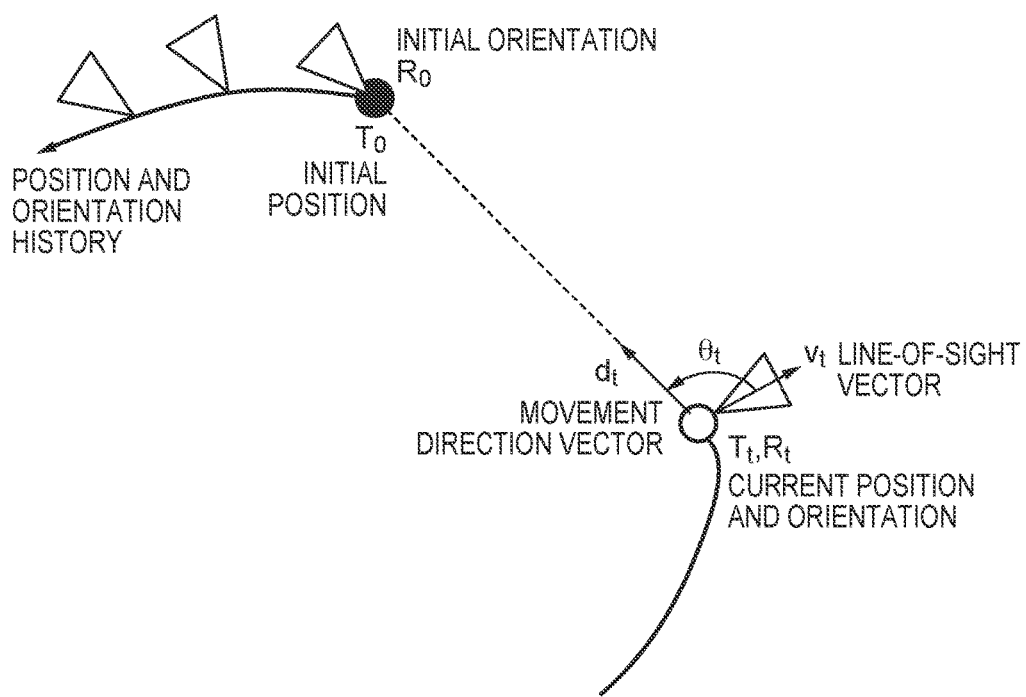
FIG. 7A-FIG. 7B are views illustrating a method by which a guide generating unit determines a guidance direction according to the second embodiment.
Figure 7B:
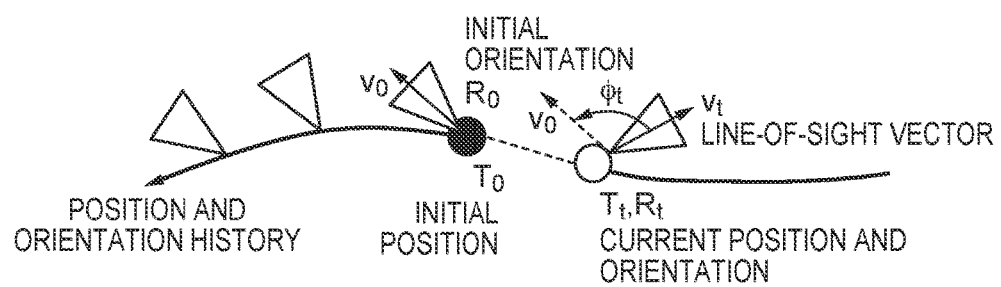

In the present embodiment, processing by which the guide generating unit 204 determines the guidance direction from the current position and orientation towards the initial position and orientation is described using FIG. 7A and FIG. 7B. In FIG. 7A, an initial position T0 is indicated by a black circle and an initial orientation R0 by a triangle. The triangle indicates the field of view direction at R0. The current position and orientation Tt and Rt are indicated similarly by a white circle and a triangle. vt is a line-of-sight vector that can be calculated from the current orientation Rt. A movement direction vector dt which indicates a direction towards which to head from the current position Tt is represented by Formula (1).

$$dt = T0 - Tt \qquad (1)$$

The guidance direction can be determined by the angle θt from vt to dt. If et is positive, the guidance direction is left, and if it is negative, the guidance direction is right. That is, configuration may be taken such that the guide generating unit 204 generates, as the guide instructing image 60, a leftward direction arrow symbol if et is positive and a rightward direction arrow symbol if it is negative.

Meanwhile, if the current position and orientation are sufficiently close to the initial position and orientation, it is necessary for the guide generating unit 204 to guide so as to cause the current orientation to match the initial orientation. The method for determining the guidance direction in such a case will be described using FIG. 7B. If the line-of-sight vector of the initial orientation in FIG. 7B is made to be v0, the guidance direction is determined by the angle φt formed from vt to v0. If φt is positive, the guidance direction is left, and if it is negative, the guidance direction is right. That is, configuration may be taken such that the guide generating unit 204 generates, as the guide instructing image 60, a leftward direction arrow symbol if φt is positive and a rightward direction arrow symbol if it is negative.

The three-dimensional map generating unit 206 generates a three-dimensional map of the measurement area from the positions and orientations and the input images 10 that the state storage unit 207 holds. Whereas in the first embodiment, generation of the three-dimensional map is performed after a sequence of capturing is completed, in the present embodiment generation/updating of the three-dimensional map is performed whenever an input image 10 is inputted and corresponding position and orientation are estimated. The generated/updated three-dimensional map is held in the state storage unit 207. Also, if it is determined that a closed path is formed by the determining unit 203 and the capturing completes, the loop closing process is performed, and optimization processing is performed in relation to the three-dimensional map generated thus far.

The state storage unit 207 stores/holds input images 10 at the respective times at which the image obtaining unit 201 obtains them. Also, the position and orientation estimated by the position/orientation obtaining unit 208 are held in association with the input image 10 captured at the same time. Also, the state storage unit 207 holds a three-dimensional map that is generated/updated by the three-dimensional map generating unit 206, and performs transmission/reception of data with the three-dimensional map generating unit 206 as necessary.

The position/orientation obtaining unit 208 estimates the position and orientation of the current input image 10 by SLAM processing with reference to past input images 10, their positions and orientations, and the three-dimensional map generated thus far. The estimated position and orientation is sent to the state storage unit 207 and held in association with the input image 10.

<Processing>

The control of the information processing apparatus 200 according to the present embodiment which is equipped with the foregoing configuration is described below. FIG. 8A is a flowchart illustrating a procedure of a process that the information processing apparatus 200 according to the present embodiment performs. Compared to the first embodiment, processing of step S1020 is changed into step S1025. In step S1025, obtainment of the position and orientation for the current input image 10, and the three-dimensional map generation/updating is performed.

FIG. 8B is a flowchart that illustrates a flow of processing in step S1025. In step S2010, the image capturing unit 101 captures the current input image 10. The input image 10 is fed into the information processing apparatus 200 through the image obtaining unit 201. Also, the guide output unit 205 from this point in time starts the output of the output image 70 to the display unit 102.

In step S2020, the position/orientation obtaining unit 208 obtains the position and orientation of the input image 10 by SLAM processing using the three-dimensional map and the input images 10 up until present from when activation started that are held in the state storage unit 207.

In step S2030, the three-dimensional map generating unit 206 generates the three-dimensional map using the positions and orientations and the input images 10 held in the state storage unit 207. If the three-dimensional map is already generated, it performs three-dimensional map update processing.

The processing order of the processing of step S2020 and step S2030 may be interchanged, and may be performed simultaneously. In any event, by completing the processing up to step S2030, the input image 10 is fed into the information processing apparatus 200, and the position and orientation that corresponds thereto and the three-dimensional map up until the present are generated/updated.

In step S1030, the guide generating unit 204 generates the guide instructing image 60 and outputs it to the guide output unit 205. As explained previously, in the present embodiment, the guide generating unit 204 generates the guide instructing image 60 based on the initial position and orientation that the state storage unit 207 holds and the position and orientation that the position/orientation obtaining unit 208 obtains. The guide output unit 205 superimposes the guide instructing image 60 on the input image 10 to generate the output image 70.

In step S1040, the determining unit 203 performs closed path determination processing on the current input image 10 if the operation mode is in the closed path determination mode. Meanwhile, in the case of the activation mode, the state storage unit 207 registers the initial position and orientation image 20 and the initial position and orientation, and after a predetermined time has elapsed, transitions the operation mode of the determining unit 203 to the closed path determination mode.

In step S1050, if the closed path determination processing succeeds in step S1040 (the closed path is formed), the determining unit 203 registers the input image 10 in the image storage unit 202 as the closed path attaining image, and proceeds to step S1060. Otherwise, the processing returns to step S1025.

In step S1060, the three-dimensional map generating unit 206 performs loop closing optimization processing with the three-dimensional map generated in step S2030 as an initial value using the input image 10 stored in step S2010, the initial position and orientation image 20, the initial position and orientation, the position and orientation of the input image 10 estimated in step S2020, and the closed path attaining image obtained in step S1050. When the optimized three-dimensional map is generated, the processing of the present embodiment completes.

As discussed above, by virtue of the present embodiment, it becomes possible to indicate specifically the direction in which to form a closed path for which a loop closing process can be applied, and to provide guidance of the movement of the image capturing unit efficiently to a user of an apparatus by using positions and orientations and a three-dimensional map that are calculated dynamically from captured images. Also, generation of a higher precision three-dimensional map becomes possible by applying the loop closing process to the three-dimensional map that is generated.

With such a configuration, it becomes possible to provide guidance, to a user of an apparatus, to a position and orientation for forming a closed path for which a loop closing process can be applied. In such a case, by presenting the specific movement direction to the user, it becomes possible for the user to reach the position and orientation for forming the closed path more efficiently.

[Eighth Variation]

Configuration may be taken so that in the position/orientation obtaining unit 208 in the present embodiment, a position/orientation sensor is installed in the image capturing unit 101, and the position and orientation are obtained directly, rather than obtaining the position and orientation from the input image 10 by the SLAM processing. Alternatively, configuration may be taken to arrange a feature such as a marker on the image capturing unit 101, to capture an image of the image capturing unit 101 by an image capturing apparatus that is further arranged externally, and to extract the feature from the image, and thereby obtain the position and orientation of the image capturing unit 101.

If the position and orientation of the image capturing unit 101 are not calculated by SLAM using the input image 10 but estimated by an external apparatus as previously explained, the three-dimensional map generating unit 206 need not generate a three-dimensional map in real-time while capturing, and the state storage unit 207 need not continuously hold the three-dimensional map. Also, configuration may be taken such that only positions of three-degrees-of-freedom, of a position and orientation of six-degrees-of-freedom, or only the orientation is measured by an external apparatus, and the remaining parameters are calculated by SLAM processing.

[Ninth Variation]

For the image capturing unit 101 in the present embodiment, it is possible to use something that can measure the depth from the viewpoint of the image capturing unit 101, such as a depth sensor. The three-dimensional map generating unit 206 and the position/orientation obtaining unit 208 may perform the position and orientation estimation and the generation of the three-dimensional map using a depth image substituting for the input image 10.

[Tenth Variation]

Configuration may be taken such that the determining unit 203 uses the history (the track) of the position and orientation of the input image 10 in the determination of the closed path. Because it is advantageous that the track of the position and orientation be widely distributed at the time of loop closing optimization, it is possible to add this as a determination condition of the determining unit 203. For example, whether or not the track of positions and orientations in the space (measurement area) for which the three-dimensional map is generated has sufficient range may be added to the closed path detection determination condition.

Figure 9:
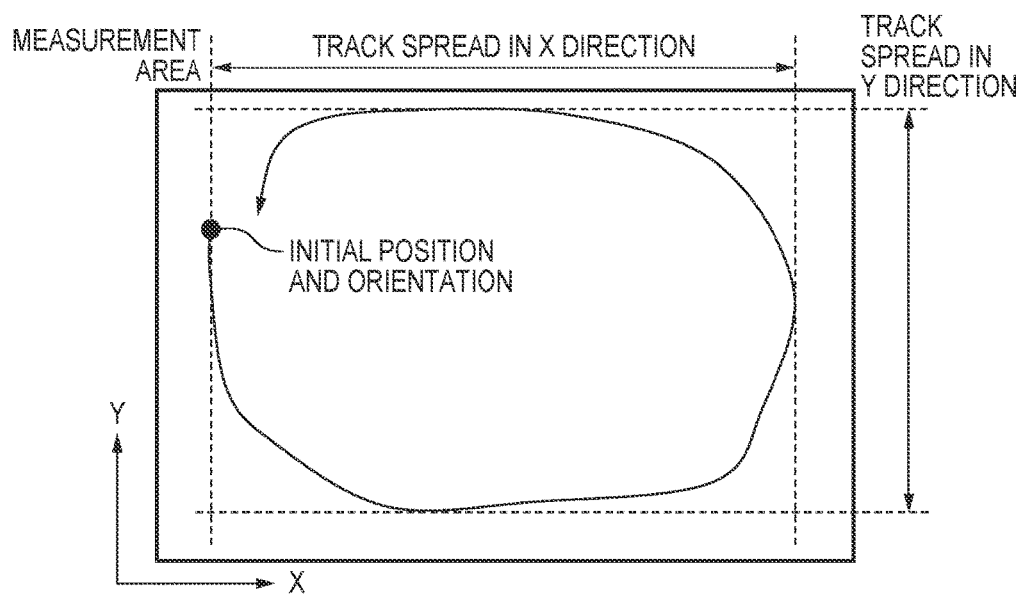
FIG. 9 is a view for describing an overview of an additional determination process that a determining unit according to a tenth variation performs.

In FIG. 9 an example of this is illustrated. The rectangle of FIG. 9 indicates a measurement area seen from above. The curve drawn therein illustrates the track of a position and orientation started from the initial position and orientation. Because the X direction and the Y direction sides both have sufficient length in relation to the size of the measurement area when defining a circumscribing rectangle with respect to the track of FIG. 9, if a closed path is formed at this point in time, it is possible to expect that a three-dimensional map having good precision can be generated. A ratio of the lengths of the X axis and the Y-axis directions of the measurement area and the ranges in the X-axis direction and the Y-axis direction of the track circumscribing rectangle, for example, may be calculated, and this ratio being greater than or equal to a threshold may be used as the determination condition. Also, configuration may be taken to obtain the measurement area and an area that approximates, as a polygon, the shape that the track traces, and to use a ratio of the area and the measurement area.

[Eleventh Variation]

Configuration may be taken such that the guide generating unit 204 generates a guidance instruction prioritizing the direction in which the track of the position and orientation described in the seventh variation has sufficient range (direction in which the range expands). Configuration may be taken such that the guide generating unit 204 generates the guide instructing image 60 so as to reach the position and orientation that finally forms the closed path by causing a direction, by which at least one side becomes larger with respect to a rectangle circumscribing the track of FIG. 9, to be taken.

[Twelfth Variation]

Configuration may be taken such that the determining unit 203 uses a three-dimensional map that the state storage unit 207 holds in the closed path determination processing. Because it is advantageous that a point group forming the three-dimensional map be uniformly distributed in the measurement area, the density distribution of the three-dimensional point group generated as the three-dimensional map may be added to the determination condition. For example, configuration may be taken such that if a region in which the three-dimensional point group is sparse still remains, the determining unit 203 will cause the closed path determination processing to fail, and the guide generating unit 204 will generate the guide instructing image 60 for the user of the information processing apparatus 200 so that they reach that region.

[Thirteenth Variation]

Configuration may be taken such that the determining unit 203, using the three-dimensional map, the positions and orientations, and the input images 10 that the state storage unit 207 holds, uses a re-projection error in each input image in the determination of the closed path. The determining unit 203 re-projects on the input image 10, based on the position and orientation, the three-dimensional point group that forms the three-dimensional map that the state storage unit 207 holds, and calculates a difference between feature points extracted by image processing and the re-projected coordinates. If the difference is large, it means that estimation accuracy for position and orientation or the three-dimensional map is not good. Therefore, configuration may be taken such that the determining unit 203 causes the closed path determination processing to fail, and the guide generating unit 204 generates the guide instructing image 60 to cause the user of the information processing apparatus 200 to recapture the input image 10 in that region.

[Fourteenth Variation]

Configuration may be taken such that the guide generating unit 204 changes the color displayed in the guide instructing image 60 as the user of the information processing apparatus 200 approaches or moves away from the target position and orientation for forming the closed path. By making the fill color of FIG. 6C thinner or making the fill region narrower as the target position and orientation is approached, for example, the user of the information processing apparatus 200 can easily recognize that they are approaching the target position and orientation.

To determine that the guide generating unit 204 is approaching or moving away from the target position and orientation, the number of feature points that correspond between the initial position and orientation image 20 and the input image 10 may be used rather than just using the track of the position and orientation. If the number of corresponding feature points is increasing, then it is possible to determine that the user is approaching the initial position and orientation. Conversely, if the number of corresponding feature points is decreasing, then it is possible to determine that the initial position and orientation is being moved away from.

[Fifteenth Variation]

The guide generating unit 204 and the guide output unit 205 may use a method other than an image to indicate the direction in which the user should move. The direction in which the user of the information processing apparatus 200 should move may be indicated by a voice using an acoustic apparatus (not shown). It is possible to directly instruct a movement direction such as right or left. Alternatively, configuration may be taken so as to guide the user of the information processing apparatus 200 by providing audio indicating that a virtual object is leaving in the direction that they should move, for example, by stereophonic sound. The user of the information processing apparatus 200 is enabled to approach the target position and orientation by following in the direction that the virtual object leaves.

[Sixteenth Variation]

While both an arrow symbol and an overhead view are illustrated as examples of the guide instructing image 60 in FIG. 6A, the guide instructing image 60 may be configured by only one of these.

Third Embodiment

<Outline>

In the present embodiment, description will be given for an information processing apparatus which can be applied in a case when a high precision three-dimensional map is generated and prepared in advance prior to an MR (or AR) experience. A user of the information processing apparatus 200 captures an image sequence for generating the three-dimensional map while holding a connected camera and moving. The information processing apparatus of the present invention first guides the user so that a three-dimensional map that is ideal for estimation of position and orientation at a time of an MR experience is generated. As a consequence, the user is guided to capture an image sequence so that the path of movement of the user spreads spatially while observing a region in which it is envisioned that a virtual object will be arranged at a time of an MR experience which is designated in advance in the information processing apparatus.

Specifically, an image indicating the direction of the region in which the virtual object is arranged and the direction to move in which the track spreads spatially are presented to the user. The user moves the camera so capture an image sequence that is ideal for estimation of position and orientation at a time of an MR experience while watching this image. The information processing apparatus guides the user so that next loop closing becomes possible when it detects that such an image sequence is obtained. Specifically, an image that indicates the direction of the start point of the path is presented to the user. While watching this image, the user moves the camera such that the position and orientation of the camera approximately matches the initial position and orientation. The information processing apparatus determines that the camera approximately reaches the initial position and orientation and performs a loop closing process. Thereby, the information processing apparatus 200 performs an optimization such that the position and orientation between a start point and an end point of a path are caused to match, and generates a high precision three-dimensional map.

<System Configuration>

The overall configuration of the system according to the present embodiment is the same as the configuration in the second embodiment illustrated in FIG. 5. However, in the present embodiment, there are parts that differ to the second embodiment regarding functional module operation. Also, portions that differ from the second embodiment are mainly described, and description is omitted for portions that are the same.

<Configuration of the Information Processing Apparatus>

The determining unit 203 performs three-dimensional map generation determination processing for whether or not the three-dimensional map for performing the MR experience is generated, and closed path determination processing for detecting a closed path. In the present embodiment, the determining unit 203 has at least three modes: an activation mode, a three-dimensional map generation mode, and a closed path determination mode. In the present embodiment, the determining unit 203 transitions from the activation mode to the three-dimensional map generation mode if the initial position and orientation is registered and a later described virtual object presentation field is detected.

The virtual object presentation field is something that is input into the information processing apparatus 200 as a region in which a virtual object is presented at the time of the MR experience, and includes three-dimensional coordinates indicating the center of the virtual object and information of the size that the virtual object occupies (for example, values of the vertical and horizontal heights that define the bounding box of the virtual object). The virtual object presentation field is input into the information processing apparatus 200 as numerical values in advance. The state storage unit 207 holds the center coordinates and size of the virtual object presentation field that are inputted.

The determining unit 203 transitions from the three-dimensional map generation mode to the closed path determination mode if it succeeds at three-dimensional map generation completion determination processing. The three-dimensional map generation completion determination processing is performed as follows.

The determining unit 203 references the track of the position and orientation estimated thus far similarly to in the seventh variation. It determines whether or not both the sides in the X direction and the Y direction of the track have sufficient length with respect to the size of the measurement area (first determination). Furthermore, the determining unit 203, with reference to a number of times that the virtual object presentation field was included in the input image 10, determines whether or not the number of times is sufficiently large in relation to the history of the position and orientation (second determination). The determining unit 203 determines that the three-dimensional map generation completion processing succeeds if the two determination conditions are both satisfied. Operation of the determining unit 203 after transition to the closed path determination mode is the same as in the second embodiment.

The guide generating unit 204 generates the guidance instruction image 40 for guidance to an ideal position and orientation for observing the virtual object presented at the time of the MR experience if the determining unit 203 is in the three-dimensional map generation mode. The guide generating unit 204 generates the guidance instruction image 40 using the positions and orientations corresponding to the input images 10 held in the state storage unit 207, the three-dimensional map, and the virtual object presentation field. The generated guide instructing image 80 (refer to FIG. 11) is the same as in the second embodiment, but since the guidance direction in the present embodiment differs with respect to the second embodiment, it is described below.

In the present embodiment, the guide generating unit 204, by orienting the direction of the virtual object presentation field, provides guidance to the user of the information processing apparatus 200 in a direction in which the track of the position and orientation spreads within the measurement area. Regarding the latter, configuration may be taken to guide in a direction that increases in distance from the initial position and orientation, and in which the area of the circumscribed polygon of the track of the position and orientation becomes larger.

Figure 10:
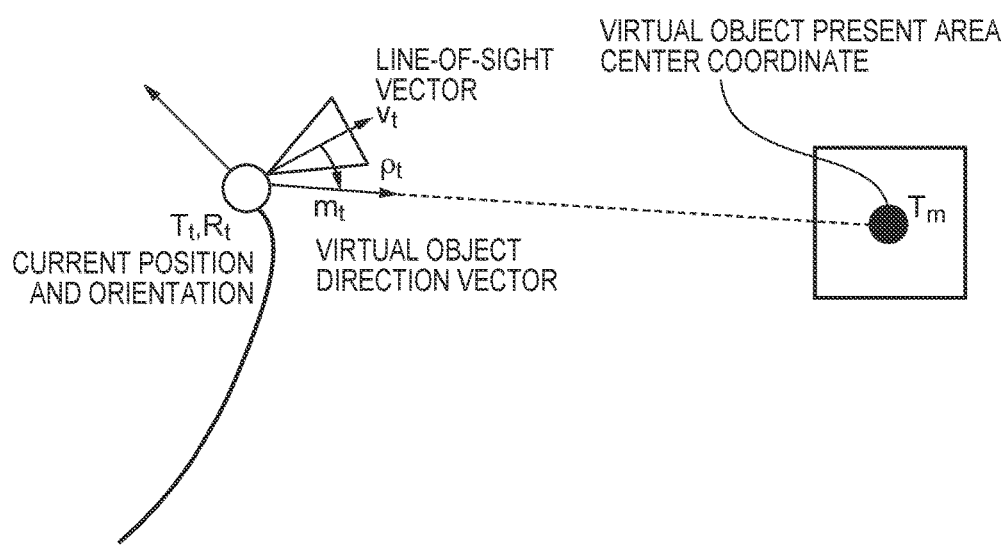
FIG. 10 is a view illustrating a method by which a guide generating unit determines a guidance direction according to a third embodiment.

In the present embodiment, a method for determining a direction when the guide generating unit 204 guides so to face the direction of the virtual object presentation field from the current position and orientation is described with reference to FIG. 10. In FIG. 10, if the center coordinates of the virtual object presentation field is Tm, the direction vector mt facing the virtual object presentation field from the current position is represented by Formula (2).

$$mt = Tm - Tt \quad (2)$$

Here, the guidance direction is determined by the angle ρt formed from vt to mt. If ρt is positive, the guidance direction is left, and if it is negative, the guidance direction is right. That is, configuration may be taken such that the guide generating unit 204 generates, as the guide instructing image 80, a leftward direction arrow symbol if ρt is positive and a rightward direction arrow symbol if it is negative.

Figure 11:
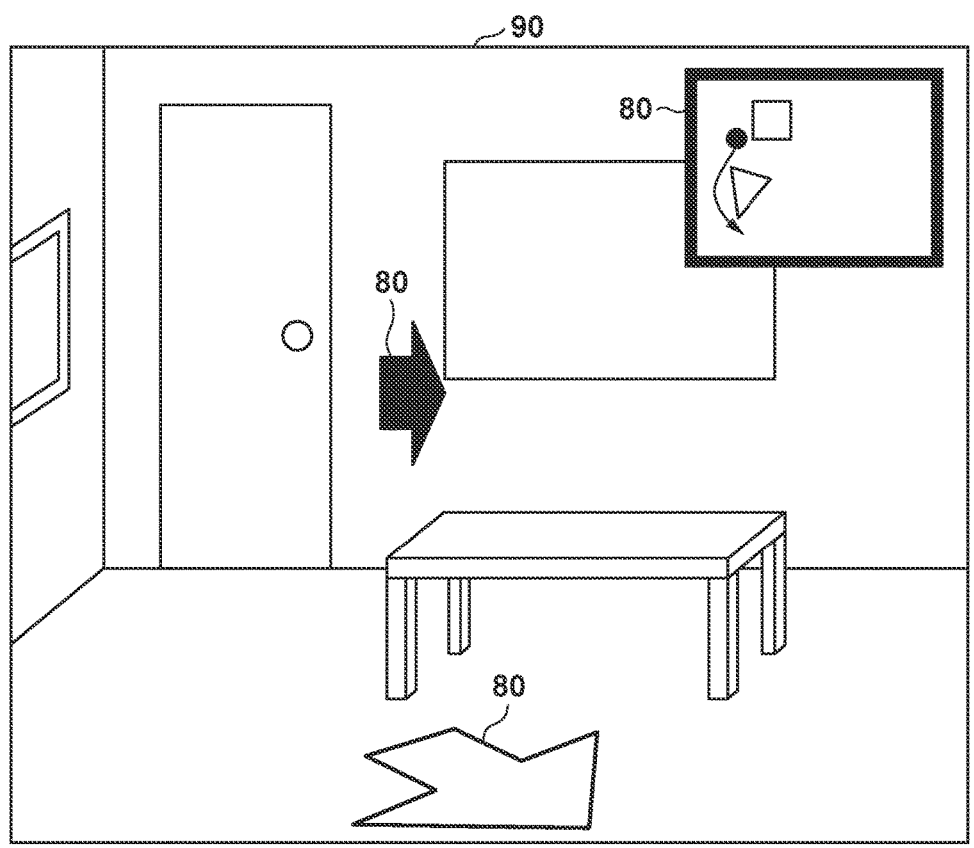
FIG. 11 is a view illustrating an example of a guidance instruction image and an output image in the third embodiment.

In FIG. 11, an example in which the guide instructing image 80 and an output image 90 on which it is superimposed are illustrated according to the present embodiment. In FIG. 11, two kinds of arrow symbols indicating guidance directions are drawn as the guide instructing image 80. In FIG. 11, a black arrow symbol indicates the direction of the virtual object presentation field, and prompts the user of the information processing apparatus 200 to look in that direction. Also, a white arrow symbol indicates the movement direction for generating the three-dimensional map, and indicates the direction in which the user of the information processing apparatus 200 should move. That is, the user of the information processing apparatus 200 can easily understand that the optimal three-dimensional map will be generated by moving in the direction indicated by the white arrow symbol while facing the direction illustrated by the black arrow symbol. Also, configuration may be taken such that a portion of the guide instructing image 80 is displayed superimposing a virtual object to be actually presented.

<Processing>

The control of the information processing apparatus 200 according to the present embodiment which is equipped with the foregoing configuration is described below. The flowchart, which illustrates a processing procedure that the information processing apparatus 200 according to the present embodiment performs, is approximately the same as the flowchart of the second embodiment illustrated in FIG. 8, but regarding the content of the processing, there are parts that differ to in the second embodiment. Also, portions that differ from the second embodiment are mainly described, and description is omitted for portions that are the same.

In step S1030, the guide generating unit 204 generates the guide instructing image 80 which is according to the operation mode of the determining unit 203. The guide instructing image 80, which is for guiding to a position and orientation ideal for observing the virtual object presented at the time of the MR experience, is generated if the operation mode of the determining unit 203 is the three-dimensional map generation mode. Meanwhile, if the mode of the determining unit 203 is the closed path determination mode, the guidance instruction image 40 or 60 for causing the image capturing unit 101 to reach the initial position and orientation is generated similarly to in the first and second embodiments. If the mode of the determining unit 203 is the three-dimensional map generation mode, the guide output unit 205 generates the output image 90 overlapping the guide instructing image 80 on the input image 10.

In step S1050, the determining unit 203 performs different determination processing in accordance with the operation mode. If the operation mode is the three-dimensional map generation mode, a three-dimensional map generation completion determination process is performed. If the three-dimensional map generation completion determination succeeds, the determining unit 203 causes its operation mode to transition to the closed path determination mode. Also, if the operation mode is the three-dimensional map generation mode, after the three-dimensional map generation completion determination processing, the processing returns to step S1025 regardless of the result. Meanwhile, if the operation mode is the closed path determination mode, closed path determination processing is performed similarly to in the first and second embodiments. If the determination succeeds, the processing proceeds to step S1060, and otherwise the processing returns to step S1025.

In step S1080, the guide generating unit 204 generates the guidance instruction image 40, 60, 80, or the like which differ in accordance with whether the operation mode of the determining unit 203 is the three-dimensional map generation mode or the closed path determination mode, and outputs to the guide output unit 205.

As discussed above, by virtue of the present embodiment, it becomes possible to initially guide a user of the information processing apparatus 200 to an ideal position and orientation for viewing a virtual object displayed at a time of an MR experience by using the three-dimensional map and the position and orientation calculated dynamically from captured images. Also, it becomes possible to provide guidance for the position and orientation so as to form a closed path for which a loop closing process can be applied. By applying loop closing processing, it becomes possible to generate a high precision three-dimensional map that is ideal for estimation of the position and orientation at a time of an MR experience.

[Variation 17]

If something by which it is possible to designate a region in which it is envisioned that the virtual object is presented in the space, the virtual object presentation field may make the designation by any method. While numerical values are input in advance in the present embodiment, configuration may be taken such that, for example, a marker whose shape or pattern is known beforehand is arranged spatially, and the center coordinates are automatically calculated from the marker image appearing in the input image 10.

[Eighteenth Variation]

The guide generating unit 204 may guide so as to avoid a direction in which one cannot move due to the existence of an obstacle with reference to a three-dimensional map generated when guiding the user of the apparatus.

Fourth Embodiment

<Overview>

In the present embodiment, description is given for an information processing apparatus that can be applied in a case of carrying out an MR (or AR) experience while generating a high precision three-dimensional map. The user of the information processing apparatus 200 can carry out an MR experience while wearing an HMD, in which the image capturing unit 101 and the display unit 102 are integrated, and moving. Here, the HMD position and orientation are simultaneously calculated using the three-dimensional map generated thus far while generating the three-dimensional map using a group of images that the information processing apparatus of the present invention captured by a camera. The information processing apparatus presents to the user a virtual image from the calculated HMD position and orientation by computer graphics (CG). The information processing apparatus uses the estimated position and orientation to guide the user so that loop closing becomes possible. Specifically, an image that indicates a direction in which to reach the initial position and orientation which is the start point of the path from the current position and orientation is presented to the user. While watching this image, the user moves the camera such that the worn HMD position and orientation of the camera approximately match the initial position and orientation.

When the information processing apparatus determines that the HMD approximately reaches the initial position and orientation, it performs a loop closing process. Thereby, the information processing apparatus performs an optimization such that the position and orientation between a start point and an end point of a path are caused to match, and the thus far generated three-dimensional map is modified and precision is improved.

<System Configuration>

Figure 12:
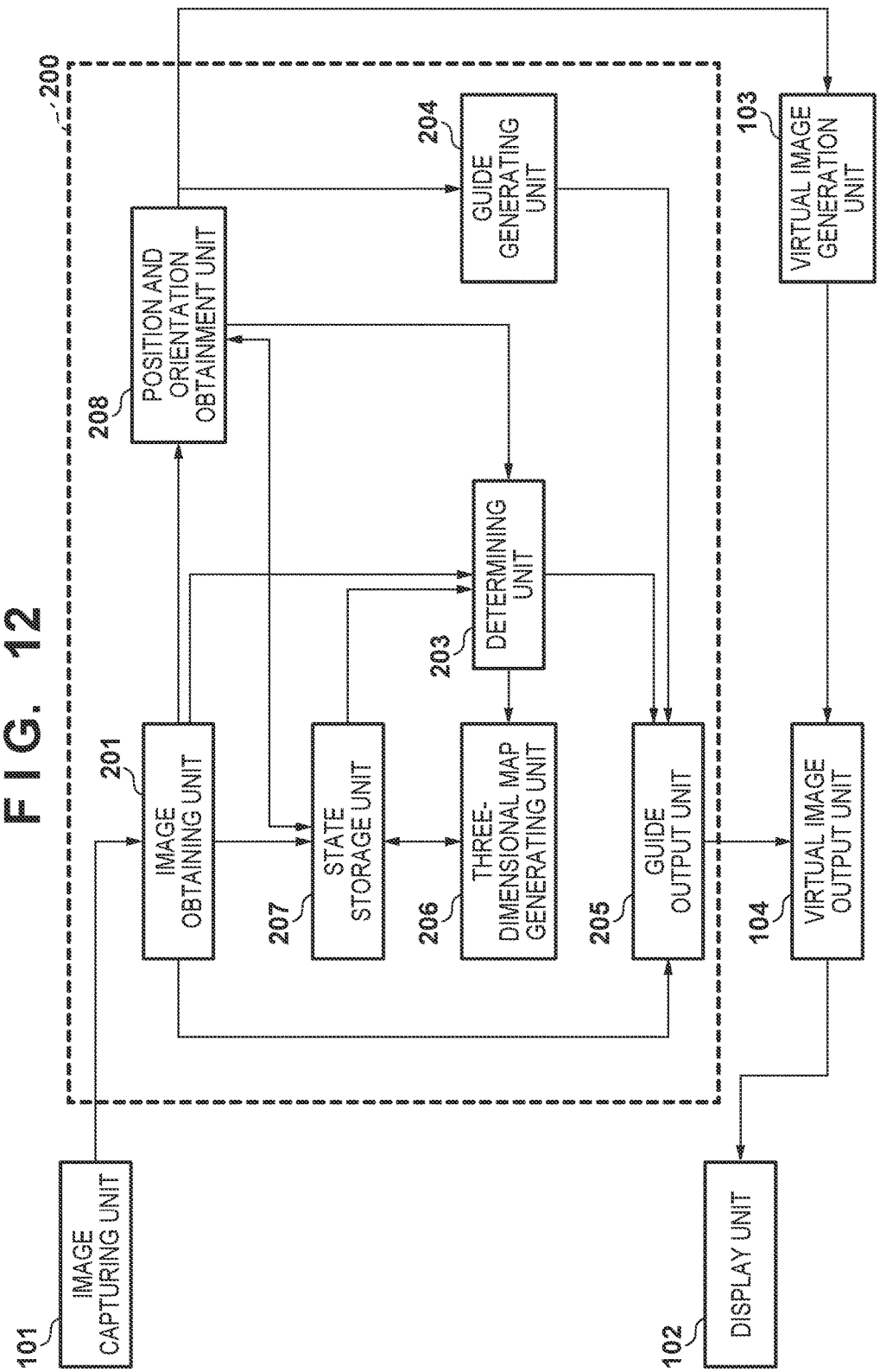
FIG. 12 is a view illustrating a configuration of a system and an information processing apparatus configuration according to a fourth embodiment.

FIG. 12 is a view illustrating a configuration of a system according to the fourth embodiment. Each frame in the rectangle in FIG. 12 indicates a functional module for performing respective processing of the present embodiment, and the arrow symbols indicate a flow of data. The system according to the present embodiment is equipped with the information processing apparatus 200, and the image capturing unit 101, the display unit 102, a virtual image generation unit 103, and a virtual image output unit 104 which are connected thereto. The configuration of FIG. 12 is only an example, and there is no limitation to what is illustrated. Also, portions that differ from the second embodiment are mainly described, and description is omitted for portions that are the same.

<Configuration of the Information Processing Apparatus>

In the present embodiment, the virtual image generation unit 103 is arranged externally with respect to the information processing apparatus 200. The virtual image generation unit 103 receives the HMD position and orientation by the position/orientation obtaining unit 208, and performs processing to generate a virtual image that is presented to the user that is having an MR experience. More specifically, the virtual image generation unit 103 generates a virtual image 100 by drawing a virtual object by computer graphics making the HMD position and orientation obtained in the position/orientation obtaining unit 208 the viewpoint. The virtual image 100 generated in this fashion is outputted to the virtual image output unit 104.

Furthermore, in the present embodiment, external to the information processing apparatus 200 the virtual image output unit 104 is arranged. The virtual image output unit 104 inputs the virtual image 100 from the virtual image generation unit 103 and the output image 70 from the guide output unit 205. The virtual image output unit 104 generates a final output image 110 superimposing the virtual image 100 on the output image 70. The output image 110 is sent to the display unit 102 which is integrated in the HMD, and it is presented to the user of the apparatus.

Figure 13:
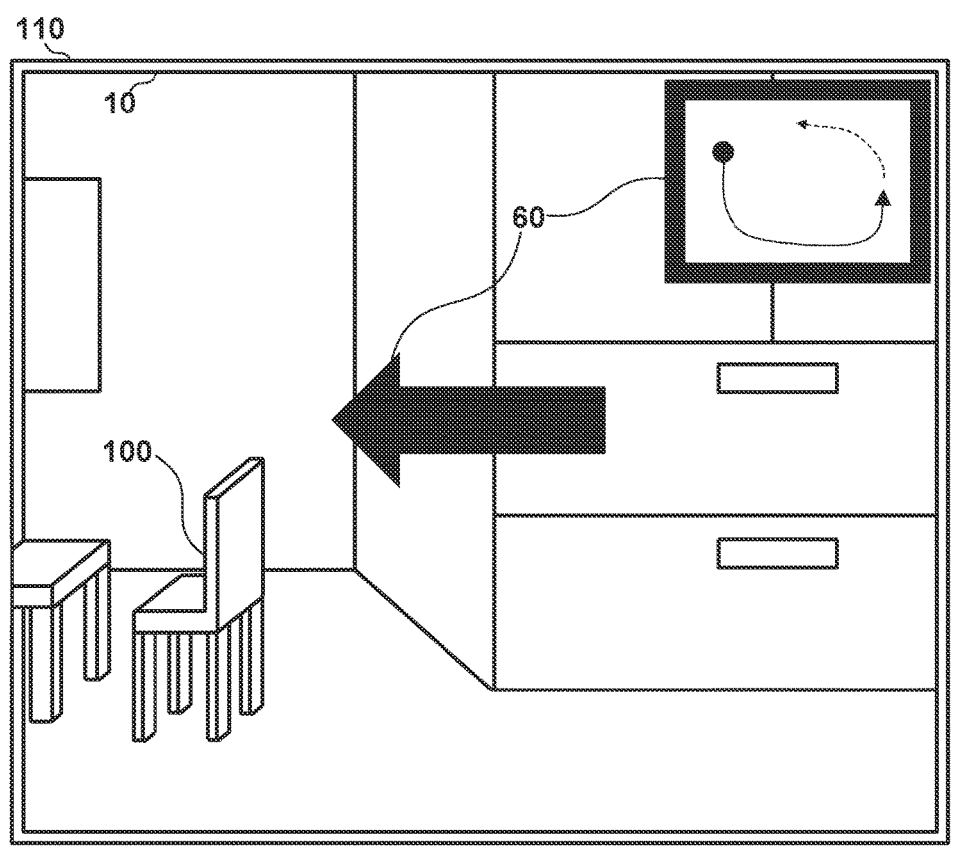
FIG. 13 is a view illustrating an example of a guidance instruction image, a virtual image and an output image in a fourth embodiment.

FIG. 13 is a view for illustrating an example of the final output image 110 that the virtual image output unit 104 outputs. Unlike the output image 70 in the second embodiment, the virtual image 100, which is drawn by CG and on which a virtual object (a chair in this example), is further superimposed on the output image 70 from the estimated position and orientation. That is, the user of the apparatus is guided to the position and orientation in order to form a closed path to which loop closing process can be applied by the user referencing the guidance instruction image 40 that is simultaneously displayed while observing the virtual image 100 in the MR experience.

Furthermore, in the present embodiment, a three-dimensional map modification unit 209 is provided. The three-dimensional map modification unit 209 modifies the three-dimensional map held in the state storage unit 207 if it is determined that the closed path is formed by the determining unit 203. The three-dimensional map modification unit 209 performs the loop closing process and modifies the three-dimensional map by performing optimization in relation to the three-dimensional map.

<Processing>

The control of the information processing apparatus 200 according to the present embodiment which is equipped with the foregoing configuration is described below. FIG. 14 is a flowchart illustrating a procedure of a process that the information processing apparatus 200 according to the present embodiment performs. Compared to the second embodiment, the processing of step S1030 is changed to step S1035, and the processing of step S1060 is changed to step S1065. Also, step S1070 is added.

In step S1035, the guide generating unit 204 generates the guide instructing image 60. The guide generating unit 204 outputs the generated guide instructing image 60 to the guide output unit 205. Also, simultaneously, the virtual image generation unit 103 generates the virtual image 100 by drawing a virtual object by CG from position and orientation obtained in step S1025. The virtual image generation unit 103 outputs the generated virtual image 100 to the virtual image output unit 104. Also, in step S1035, the guide output unit 205 generates the output image 70 by superimposing the guide instructing image 60 on the input image 10, and outputs it to the virtual image output unit 211. The virtual image output unit 104 generates the final output image 110 by superimposing the virtual image 100 on the output image 90, and outputs it to the display unit 102.

In S1065, the three-dimensional map modification unit 209 modifies the three-dimensional map held in the state storage unit 207 if it is determined that the closed path is formed by the determining unit 203. The three-dimensional map modification unit 209 performs the loop closing process and modifies the three-dimensional map by performing optimization in relation to the three-dimensional map. The modified three-dimensional map is held in the state storage unit 207, and when next the processing of step S1025 is performed, the three-dimensional map that is modified and for which precision is improved in step S1070 is used.

In step S1070, the processing of the information processing apparatus 200 according to the present embodiment is completed if the user of the apparatus completes the MR experience. Otherwise, the processing returns to step S1025.

As discussed above, by virtue of the present embodiment, it becomes possible to provide guidance to a position and orientation in order to form a closed path for which a loop closing process can be applied during an MR experience in relation to a user of an apparatus. Also, the three-dimensional map is modified and the precision is improved by applying the loop closing process to the three-dimensional map that is generated. The result of this is that the position and orientation of the HMD that the user having the MR experience is wearing are estimated with high precision, and it becomes possible to generate a correct virtual image without a positional misregistration.

Effect of Embodiment

By virtue of the first embodiment, it becomes possible to provide guidance for position and orientation to a user of an apparatus so as to form a closed path for which a loop closing process can be applied. Also, generation of a high precision three-dimensional map becomes possible by applying the loop closing process to the image sequence that is obtained.

By virtue of the second embodiment, it becomes possible to provide guidance for the position and orientation to a user of an apparatus so as to form a closed path for which a loop closing process can be applied. In such a case, by presenting the specific movement direction to the user, it becomes possible for a user to reach a position and orientation for forming the closed path more efficiently. Also, generation of a higher precision three-dimensional map becomes possible by applying the loop closing process to the three-dimensional map that is generated.

By virtue of the third embodiment, it becomes possible to perform guidance to positions and orientations at which to capture an image sequence in order to generate a three-dimensional map that is ideal for estimation of position and orientation at the time of the MR experience. Furthermore, after capturing such an image sequence, it becomes possible to provide guidance for the position and orientation so as to form a closed path for which a loop closing process can be applied. By applying loop closing processing, it becomes possible to generate a high precision three-dimensional map that is ideal for estimation of the position and orientation at a time of an MR experience.

By virtue of the fourth embodiment, it becomes possible to provide guidance to a position and orientation to a user of an apparatus in order to form a closed path for which a loop closing process can be applied during an MR experience. Also, the three-dimensional map is modified and the precision is improved by applying the loop closing process to the three-dimensional map that is generated. The result of this is that the position and orientation of the HMD that the user having the MR experience is wearing are estimated with high precision, and it becomes possible to generate a correct virtual image without a position misalignment.

Definitions

The image obtaining unit 201 in the present invention may be anything if it can input an image that the image capturing unit 101 captured into the information processing apparatus 200. Also, the inputted image may be any kind of an image such as an RGB color image, a grayscale image, a monochrome image, a depth image, or the like.

The image storage unit 202 in the present invention can be anything as long as it can hold data such as an image, a parameter, or the like, while the information processing apparatus 200 is operating. It is possible to use an auxiliary storage apparatus such as a semiconductor storage apparatus such as a RAM or a flash memory, a hard disk, a solid state disk or the like.

The guide generating unit 204 and the guide output unit 205 in the present invention may be anything as long as they prompt for a change of the position and orientation of the image capturing unit 101 to roughly the same position and orientation as the initial position and orientation. In the first to third embodiments, description is given of a method of generating and outputting a guidance instruction image. It is also possible to use another method of reporting such as by audio, and configuration may be taken so as to present a vibration, a tactile sensation or the like to the user of the information processing apparatus 200. A configuration in which operation instructions are provided to a robot apparatus that has the image capturing unit 101 is also possible.

Also, configuration may be taken such that the guide generating unit 204 in the present invention not only prompts to change the position and orientation of the image capturing unit 101 to a position and orientation that are roughly the same as the initial position and orientation, but also it generates further guidance. In the third embodiment and in eleventh variation is described a method of prompting for a change of the position and orientation of the image capturing unit 101 to a position and orientation that are roughly the same as the initial position and orientation while providing guidance in a direction to improve the density and precision of a three-dimensional map that is generated.

The determining unit 203 in the present invention may be anything as long as it can determine whether or not a captured image captured in a stipulated state and a captured image captured in another state are captured with roughly the same position and orientation.

In the first embodiment, description is given of a method of determining a similarity between images by BoW. As described in the second variation, configuration may be taken so as to calculate geometric transformation parameters from feature points corresponding between images, and to calculate the similarity between images to which the geometric transformation parameters are applied.

The determining unit 203 in the present invention, in addition to determining whether or not a captured image captured in a stipulated state and a captured image captured in another state are captured with roughly the same position and orientation, may also make the determination adding other conditions. In the previously described twelfth and thirteenth variations, description is given of a method for attempting to improve quality of the generated three-dimensional map, and making a determination adding further conditions.

The three-dimensional map generating unit 206 in the present invention may be anything as long as it calculates three-dimensional coordinates of a target space using a plurality of captured images. In the previously described embodiment, description is given of a method using SfM or SLAM. As described in the fifth variation, configuration may be taken so as use a position/orientation sensor supplementally, and as described in the sixth variation configuration may be taken so as to input and use a depth image.

By virtue of the present invention, it is possible to realize generation of a high precision three-dimensional map.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-026345, filed Feb. 15, 2016 and 2016-166011, filed Aug. 26, 2016, which are hereby incorporated by reference wherein in their entirety.

What is claimed is:

1. An information processing apparatus, comprising:
one or more processors; and
a memory having stored thereon instructions which, when executed by the one or more processors, cause the information processing apparatus to:
obtain captured images that are captured by an image capturing unit at a plurality of positions and orientations;
generate a guidance instruction for causing a captured image corresponding to a position and orientation substantially the same as a captured image of a stipulated state to be obtained;
output the guidance instruction;
determine whether or not one captured image obtained after output of the guidance instruction was captured at a position and orientation substantially the same as the captured image of the stipulated state;
if the one captured image is determined to be captured at a position and orientation substantially the same as the captured image of the stipulated state, generate or update a three-dimensional map from three-dimensional coordinates of a feature included in a captured image based on the plurality of captured images including the one captured image that are captured at the plurality of positions and orientations; and
control to display the guidance instruction.

2. The information processing apparatus according to claim 1, wherein the instructions, when executed by the one or more processors, further cause the information processing apparatus to generate, as the guidance instruction, an image that includes the captured image of the stipulated state.

3. The information processing apparatus according to claim 1, wherein the instructions, when executed by the one or more processors, further cause the information processing apparatus to determine whether or not the one captured image was captured at a position and orientation substantially the same as the captured image of the stipulated state based on a similarity between the one captured image and the captured image of the stipulated state.

4. The information processing apparatus according to claim 1, wherein the instructions, when executed by the one or more processors, further cause the information processing apparatus to determine whether or not the one captured image was captured at a position and orientation substantially the same as the captured image of the stipulated state based on a geometric transformation parameter between images obtained from a feature included in the one captured image and a feature included in the captured image of the stipulated state.

5. The information processing apparatus according to claim 1, wherein the instructions, when executed by the one or more processors, further cause the information processing apparatus to store the captured image of the stipulated state.

6. The information processing apparatus according to claim 1, wherein the instructions, when executed by the one or more processors, further cause the information processing apparatus to obtain a position and orientation at which the captured image obtained is captured;
store a stipulated position and orientation corresponding to the stipulated state; and
generate a guidance instruction for causing a captured image corresponding to a position and orientation substantially the same as the stipulated position and orientation to be obtained.

7. The information processing apparatus according to claim 6, wherein the instructions, when executed by the one or more processors, further cause the information processing apparatus to generate a guidance instruction including an overhead view of a measurement area including the stipulated position and orientation and a track of a plurality positions and orientations obtained.

8. The information processing apparatus according to claim 6, wherein the instructions, when executed by the one or more processors, further cause the information processing apparatus to, based on the stipulated position and orientation and the position and orientation obtained, generate a guidance instruction including a guidance direction from a position and orientation obtained to the stipulated position and orientation.

9. The information processing apparatus according to claim 6, wherein the instructions, when executed by the one or more processors, further cause the information processing apparatus to:
further store a track of a plurality of positions and orientations corresponding to the plurality of captured images obtained, and
based on the track of the positions and orientations, generate the guidance instruction such that the spatial range of the track of the positions and orientations expands with respect to a measurement area.

10. The information processing apparatus according to claim 6, wherein the instructions, when executed by the one or more processors, further cause the information processing apparatus to, based on at least one of angles formed between each of orientation vectors, and respective Euclidean distances for each position between the stipulated position and orientation and the positions and orientations obtained, perform the determination of whether or not the one captured image was captured at a position and orientation substantially the same as the captured image of the stipulated state.

11. The information processing apparatus according to claim 1, wherein the instructions, when executed by the one or more processors, further cause the information processing apparatus to further calculate an estimation accuracy of the three-dimensional map based on the estimation accuracy performs the determination of whether or not the one captured image was captured at a position and orientation substantially the same as the captured image of the stipulated state.

12. The information processing apparatus according to claim 1, wherein the instructions, when executed by the one or more processors, further cause the information processing apparatus to determine completion of the generation of the three-dimensional map.

13. An information processing apparatus, comprising:
one or more processors;
a memory having stored thereon instructions which, when executed by the one or more processors, causes the information processing apparatus to:
obtain captured images that are captured by an image capturing unit at a plurality of positions and orientations;
generate, based on at least one captured image captured at the plurality of positions and orientations, a three-dimensional map from three-dimensional coordinates of a feature included in the captured image;
generate a guidance instruction for causing a captured image corresponding to a position and orientation substantially the same as a captured image of a stipulated state to be obtained;
output the guidance instruction;
determine whether or not one captured image obtained after output of the guidance instruction was captured at a position and orientation substantially the same as the captured image of the stipulated state;
if the one captured image is determined to be captured at a position and orientation substantially the same as the captured image of the stipulated state, modify the three-dimensional map; and
control to display the guidance instruction.

14. A method of controlling an information processing apparatus, comprising:
obtaining captured images that are captured by an image capturing unit at a plurality of positions and orientations;
generating a guidance instruction for causing a captured image corresponding to a position and orientation substantially the same as a captured image of a stipulated state to be obtained;
outputting the guidance instruction;
determining whether or not one captured image obtained after output of the guidance instruction was captured at a position and orientation substantially the same as the captured image of the stipulated state;
if the one captured image is determined to be captured at a position and orientation substantially the same as the captured image of the stipulated state, generating a three-dimensional map from three-dimensional coordinates of a feature included in a captured image based on a plurality of captured images including the one captured image that are captured at the plurality of positions and orientations; and
controlling to display the guidance instruction on a display.

15. A method of controlling an information processing apparatus, comprising:
obtaining captured images that are captured by an image capturing unit at a plurality of positions and orientations;
generating, based on at least one of the captured images captured at the plurality of positions and orientations, a three-dimensional map from three-dimensional coordinates of a feature included in the captured image;
generating a guidance instruction for causing a captured image corresponding to a position and orientation substantially the same as a captured image of a stipulated state to be obtained;
outputting the guidance instruction;
determining whether or not the obtained one captured image after output of the guidance instruction was captured at a position and orientation substantially the same as the captured image of the stipulated state;
if the one captured image is determined to be captured at a position and orientation substantially the same as the captured image of the stipulated state, modifying the three-dimensional map; and
controlling to display the guidance instruction on a display.

16. A non-transitory computer-readable storage medium storing a computer program for causing a computer to:
  obtain captured images that are captured by an image capturing unit at a plurality of positions and orientations;
  generate a guidance instruction for causing a captured image corresponding to a position and orientation substantially the same as a captured image of a stipulated state to be obtained;
  output the guidance instruction;
  determine whether or not one captured image obtained after output of the guidance instruction was captured at a position and orientation substantially the same as the captured image of the stipulated state;
  if the one captured image is determined to be captured at a position and orientation substantially the same as the captured image of the stipulated state, generate a three-dimensional map from three-dimensional coordinates of a feature included in a captured image based on a plurality of captured images including the one captured image that are captured at the plurality of positions and orientations; and
  controlling to display the guidance instruction on a display.

17. A non-transitory computer-readable storage medium storing a computer program for causing a computer to:
  obtain captured images that are captured by an image capturing unit at a plurality of positions and orientations;
  generate, based on at least one captured image captured by the plurality of positions and orientations, a three-dimensional map from three-dimensional coordinates of a feature included in the captured image;
  generate a guidance instruction for causing a captured image corresponding to a position and orientation substantially the same as a captured image of a stipulated state to be obtained;
  output the guidance instruction;
  determine whether or not one captured image obtained after output of the guidance instruction was captured at a position and orientation substantially the same as the captured image of the stipulated state;
  if the one captured image is determined to be captured at a position and orientation substantially the same as the captured image of the stipulated state, modify the three-dimensional map; and
  control to display the guidance instruction on a display.

* * * * *